US011667560B2

(12) United States Patent
Hosokawa

(10) Patent No.: US 11,667,560 B2
(45) Date of Patent: Jun. 6, 2023

(54) MANUFACTURING METHOD FOR OPTICAL FIBER AND MANUFACTURING APPARATUS FOR OPTICAL FIBER

(71) Applicant: Fujikura Ltd., Tokyo (JP)

(72) Inventor: Tsukasa Hosokawa, Chiba (JP)

(73) Assignee: Fujikura Ltd., Tokyo (JP)

( * ) Notice: Subject to any disclaimer, the term of this patent is extended or adjusted under 35 U.S.C. 154(b) by 142 days.

(21) Appl. No.: 17/266,226

(22) PCT Filed: Sep. 17, 2019

(86) PCT No.: PCT/JP2019/036303
§ 371 (c)(1),
(2) Date: Feb. 5, 2021

(87) PCT Pub. No.: WO2020/059683
PCT Pub. Date: Mar. 26, 2020

(65) Prior Publication Data
US 2021/0292223 A1 Sep. 23, 2021

(30) Foreign Application Priority Data

Sep. 18, 2018 (JP) .............................. JP2018-174127
Aug. 2, 2019 (JP) .............................. JP2019-142865

(51) Int. Cl.
*C03B 37/029* (2006.01)
*C03B 37/027* (2006.01)
(Continued)

(52) U.S. Cl.
CPC ...... *C03B 37/029* (2013.01); *C03B 37/02718* (2013.01); *C03C 13/046* (2013.01);
(Continued)

(58) Field of Classification Search
None
See application file for complete search history.

(56) References Cited

U.S. PATENT DOCUMENTS

2002/0191926 A1* 12/2002 Gao .................... H01S 3/06716
359/341.1
2003/0031443 A1* 2/2003 Soljacic .................... C03C 3/07
65/435
(Continued)

FOREIGN PATENT DOCUMENTS

CN 1350509 A 5/2002
CN 1571759 A 1/2005
(Continued)

OTHER PUBLICATIONS

JP06-100328 Partial Translation of JP text in Fig. 2, Performed by USPTO Translations Service Center, Aug. 19, 2022. (Year: 2022).*
(Continued)

*Primary Examiner* — Lisa L Herring
(74) *Attorney, Agent, or Firm* — Osha Bergman Watanabe & Burton LLP

(57) ABSTRACT

A manufacturing method for an optical fiber, includes: drawing, while heating in a heating furnace, a lower end of an optical fiber preform that is to be an optical fiber having a core consisting of silica glass containing a rare earth element compound. The heating furnace has a temperature profile in which a temperature of the heating furnace increases to a maximum temperature $T_{max}$ and then decreases from an upstream side of the heating furnace toward a downstream side of the heating furnace. The temperature profile has a changing point at which the temperature decreases more steeply on the downstream side from a position where the maximum temperature $T_{max}$ is reached. At the maximum temperature, a temperature of the silica glass is higher than or equal to a glass transition temperature and the silica glass is in a single phase.

9 Claims, 19 Drawing Sheets

(51) Int. Cl.
*C03C 13/04* (2006.01)
*G02B 6/02* (2006.01)

(52) U.S. Cl.
CPC ......... *G02B 6/021* (2013.01); *G02B 6/02395* (2013.01); *C03B 2201/02* (2013.01); *C03B 2201/36* (2013.01); *C03B 2205/55* (2013.01); *C03B 2205/62* (2013.01); *C03B 2205/72* (2013.01)

(56) References Cited

U.S. PATENT DOCUMENTS

| | | | |
|---|---|---|---|
| 2009/0241604 A1 | 10/2009 | Orita et al. | |
| 2013/0336343 A1* | 12/2013 | Miyabe | H01S 3/06716 359/341.1 |
| 2021/0230051 A1* | 7/2021 | Lou | C03C 25/1068 |

FOREIGN PATENT DOCUMENTS

| | | |
|---|---|---|
| CN | 1743286 A | 3/2006 |
| CN | 101316800 A | 12/2008 |
| CN | 101999197 A | 3/2011 |
| CN | 104039724 A | 9/2014 |
| JP | S53-125857 A | 11/1978 |
| JP | S62-186941 U | 11/1987 |
| JP | S63-46439 U | 3/1988 |
| JP | H0332502 Y2 * | 7/1991 |
| JP | H04-240604 A | 8/1992 |
| JP | H06-100328 A | 4/1994 |
| JP | 2003-335545 A | 11/2003 |
| JP | 2017-36197 A | 2/2017 |
| WO | 2010/055696 A1 | 5/2010 |

OTHER PUBLICATIONS

JP06-100328 English Translation Performed by Schreiber Translations, Inc. Aug. 2022. (Year: 2022).*
JPH0332502Y2 Machine Translation Downloaded Nov. 2022. (Year: 2022).*
International Search Report issued in International Application No. PCT/JP2019/036303, dated Dec. 3, 2019 (2 pages).
Office Action issued in the counterpart Chinese Patent Application No. 201980047240.8, dated Apr. 18, 2022 (8 pages).

* cited by examiner

MANUFACTURING METHOD FOR OPTICAL FIBER AND MANUFACTURING APPARATUS FOR OPTICAL FIBER

TECHNICAL FIELD

The present invention relates to a manufacturing method for an optical fiber and a manufacturing apparatus for an optical fiber.

BACKGROUND

A fiber laser device is used in various fields such as a laser processing field and a medical field because it is excellent in light condensing property, has a high power density, and can obtain a light beam having a small beam spot. In such a fiber laser device, a rare earth-added optical fiber is used having a core to which a rare earth element is added.

By the way, the optical fiber is obtained by heating an optical fiber preform in a heating furnace and drawing the optical fiber preform. A method for manufacturing an optical fiber in this way is described in Patent Literature 1 below. In the manufacturing method for an optical fiber of Patent Literature 1 below, to prevent the surface of the drawn optical fiber from being scratched, a blow of a gas is applied perpendicularly to the side surface of the drawn optical fiber, whereby the optical fiber is rapidly cooled, and compressive stress is applied to the surface of the optical fiber to strengthen the optical fiber.

However, when it is required to reduce optical transmission loss over a long distance as in an optical fiber used for optical communication, the optical transmission loss may be reduced by slowly cooling the drawn optical fiber to reduce a Rayleigh scattering coefficient. For example, in Patent Literature 2 below, a manufacturing method for an optical fiber is described capable of rapidly cooling only the surface of the optical fiber and slowly cooling the inside of the optical fiber.

PATENT LITERATURE

[Patent Literature 1] JP S53-125857 A
[Patent Literature 2] JP 2017-36197 A

SUMMARY

The core of the optical fiber described in Patent Literature 1 and Patent Literature 2 does not contain a rare earth element. The core consisting of silica glass that does not contain rare earth elements is unlikely to undergo crystallization during the manufacturing process of the optical fiber. On the other hand, in the case of a rare earth-added optical fiber, the core consisting of silica glass to which a rare earth element is added is likely to crystallize in the manufacturing process. When such crystallization occurs in the core of the rare earth-added optical fiber, there is a concern that loss of light propagating through the core increases. Furthermore, the silica glass to which the rare earth element is added may cause phase separation in which separation occurs into a plurality of liquid phases having different composition ratios at a predetermined temperature. The occurrence of such phase separation also causes a concern that the loss of the light propagating through the core increases.

Since the manufacturing method for an optical fiber of Patent Literature 1 and Patent Literature 2 is premised on manufacture of an optical fiber containing no rare earth elements in the core, the crystallization and phase separation in the core as described above have not been studied. Thus, when an optical fiber having a core containing a rare earth element compound is manufactured by the manufacturing method for an optical fiber described in Patent Literature 1 and Patent Literature 2, there is a concern that the loss of the light propagating through the core cannot be sufficiently suppressed.

The present invention provides a manufacturing method for an optical fiber and a manufacturing apparatus for an optical fiber capable of suppressing the loss of the light propagating through a core consisting of silica glass containing a rare earth element compound.

A manufacturing method for an optical fiber of the present invention includes a drawing process of drawing while heating, in a heating furnace, a lower end portion of an optical fiber preform that is to be an optical fiber having a core consisting of silica glass containing a rare earth element compound, in which a temperature profile in the heating furnace is a profile in which temperature is increased from an upstream side toward a downstream side to a maximum temperature and then decreased and that has a changing point at which a temperature decrease becomes steep on the downstream side from a place where the maximum temperature is reached, and the maximum temperature is a temperature at which temperature of the silica glass is higher than or equal to a glass transition temperature and the silica glass is in a single phase.

In the silica glass containing the rare earth element compound, the crystallization and phase separation of the rare earth element compound occur at a temperature lower than a temperature at which the silica glass containing the rare earth element compound is in a single phase at higher than or equal to the glass transition temperature. Thus, the silica glass containing the rare earth element compound is once heated to the temperature that is higher than or equal to the glass transition temperature and at which the silica glass is in a single phase, and then cooled to a predetermined temperature at an increased cooling rate, whereby the crystallization and phase separation of the rare earth element compound can be suppressed. The manufacturing method for an optical fiber of the present invention can therefore suppress the loss of the light propagating through the core containing the rare earth element compound.

Furthermore, the temperature profile in the heating furnace may be set to cause the cooling rate to be maximized at a temperature at which separation occurs into a plurality of liquid phases respectively having different composition ratios between the rare earth element compound and a pure silica glass in an equilibrium state.

The cooling rate is maximized in a temperature range in which the phase separation occurs in the silica glass containing the rare earth element compound, whereby the phase separation of the silica glass containing the rare earth element compound can be further suppressed.

Furthermore, the temperature profile on the upstream side from the changing point in the temperature profile in the heating furnace may be approximated to a part of a normal distribution represented by a following equation (1), and the temperature profile on the downstream side from the changing point is approximated to a part of a normal distribution represented by a following equation (2), and a temperature of the heating furnace is set to cause a ratio $\sigma_t/\sigma_b$ of a dispersion $\sigma_t$ of the normal distribution represented by the equation (1) to a dispersion $\sigma_b$ of the normal distribution represented by the equation (2) to be greater than or equal to 2.

$$T = A\exp\left\{-\frac{x^2}{2\sigma_f^2}\right\} + B \quad (x < x_c) \tag{1}$$

$$T = A\exp\left\{-\frac{(x-x_0)^2}{2\sigma_b^2}\right\} + B \quad (x \geq x_c) \tag{2}$$

Here, in the above equations (1) and (2), T is a temperature at an arbitrary point in the heating furnace, A and B are constants, x is a distance to the arbitrary point from a reference point when the reference point is a position where the maximum temperature is reached and a direction from the reference point to the downstream side is the positive direction, $x_c$ is a distance from the reference point to a position where the changing point is reached, and $x_0$ is a distance from the reference point to a position where T calculated by the equation (2) is a calculated maximum temperature.

The larger the ratio $\sigma_f/\sigma_b$, the steeper the temperature decrease after the changing point of the temperature profile in the heating furnace. Furthermore, the present inventor has found that the ratio $\sigma_f/\sigma_b$ is set to be greater than or equal to 2, whereby the cooling rate of a glass wire drawn from the optical fiber preform can be made sufficiently large on the downstream side from the place where the maximum temperature is reached in the heating furnace.

Furthermore, the temperature of the heating furnace may be set to cause the ratio $\sigma_f/\sigma_b$ to be greater than or equal to 3.

The present inventor has found that the ratio $\sigma t/\sigma_b$ is set to be greater than or equal to 3, whereby the cooling rate of the glass wire drawn from the optical fiber preform can be made larger on the downstream side of the place where the maximum temperature is reached in the heating furnace.

Moreover, the temperature of the heating furnace may be set to cause the ratio $\sigma_f/\sigma_b$ to be less than or equal to 8.

As described above, the ratio $\sigma_f/\sigma_b$ is set to be greater than or equal to 2, whereby the cooling rate of the glass wire drawn from the optical fiber preform can be made sufficiently large on the downstream side from the place where the maximum temperature is reached in the heating furnace. However, the present inventor has found that when the ratio $\sigma_f/\sigma_b$ becomes larger than 8, the maximum value of the cooling rate does not change much. Furthermore, as the ratio $\sigma_f/\sigma_b$ has a lower value, setting of the temperature in the heating furnace tends to be easier. Thus, the temperature of the heating furnace is set so that the ratio $\sigma_f/\sigma_b$ is less than or equal to 8, whereby the cooling rate of the glass wire can be made larger while the setting of the temperature of the heating furnace is facilitated.

Furthermore, the dispersion $\sigma_f$ may be set to be greater than or equal to 100 mm and less than or equal to 300 mm.

As described above, the larger the ratio $\sigma_f/\sigma_b$, the steeper the temperature decrease after the changing point of the temperature profile in the heating furnace. Thus, as the dispersion $\sigma_f$ is smaller, the ratio $\sigma_f/\sigma_b$ is smaller, and the temperature decrease is gentle after the changing point of the temperature profile in the heating furnace. That is, as the dispersion $\sigma_f$ is smaller, it is easier for the cooling rate of the glass wire drawn from the optical fiber preform to asymptotically approach a constant value. The present inventor has found that the cooling rate of the glass wire can be made sufficiently high when the dispersion $\sigma_f$ is greater than or equal to 100 mm. On the other hand, the larger the dispersion $\sigma_f$, the slower the cooling rate of the glass. To obtain a high cooling rate, the dispersion $\sigma_f$ may be less than or equal to 300 mm.

Furthermore, a ratio $T_c/T_{max}$ of a temperature $T_c$ of the changing point to a maximum temperature $T_{max}$ may be set to be greater than or equal to 0.5.

When the ratio $T_c/T_{max}$ is greater than or equal to 0.5, it becomes easier to rapidly cool the glass wire drawn from the optical fiber preform after heating the glass wire to the maximum temperature. Thus, the crystallization and phase separation are more likely to be suppressed of the rare earth element compound in the silica glass constituting the core.

Furthermore, the ratio $T_c/T_{max}$ may be set to be greater than or equal to 0.7.

When the ratio $T_c/T_{max}$ is greater than or equal to 0.7, it becomes easier to rapidly cool the glass wire drawn from the optical fiber preform after heating the glass wire to the maximum temperature. Thus, the crystallization and phase separation are further likely to be suppressed of the rare earth element compound in the silica glass constituting the core.

Furthermore, a rare earth element contained in the rare earth element compound may be ytterbium (Yb), and a concentration of the rare earth element in the core may be greater than or equal to 2.0 wt % and less than or equal to 3.1 wt %.

Since Yb is a rare earth element, the greater the concentration of Yb added to the core, the more likely it is that the crystallization and phase separation occur in the core. For example, when the concentration of Yb in the core is greater than or equal to 2.0 wt % and less than or equal to 3.1 wt %, the crystallization and phase separation are likely to occur in the core. However, as described above, in the manufacturing method for an optical fiber, the temperature in the heating furnace is steeply decreased on the downstream side from a position where the temperature in the heating furnace is maximized, so that even when Yb of greater than or equal to 2.0 wt % and less than or equal to 3.1% is added, the crystallization and phase separation of Yb can be suppressed, and the loss of the light propagating through the core can be suppressed.

When the concentration of Yb added to the core is greater than or equal to 2.0 wt % and less than or equal to 3.1 wt %, the core may further contain aluminum (Al) of greater than or equal to 3.0% wt and less than or equal to 5.3 wt %, and phosphorus (P) of greater than or equal to 1.7 wt % and less than or equal to 5.6 wt %.

When Al and P are co-added with Yb, the crystallization and phase separation can be suppressed in the core to which Yb is added. In addition to this, in the manufacturing method for an optical fiber, as described above, the temperature in the heating furnace can be steeply decreased on the downstream side from the position where the temperature in the heating furnace is maximized. The crystallization and phase separation in the core can therefore be further suppressed.

Furthermore, a manufacturing apparatus for an optical fiber of the present invention includes a heating furnace that heats, with a heating element, an optical fiber preform that is to be optical fiber having a core consisting of silica glass containing a rare earth element compound, in which a temperature profile in the heating furnace is a profile in which temperature is increased from an upstream side toward a downstream side to a maximum temperature and then decreased and that has a changing point at which a temperature decrease becomes steep on the downstream side from a place where the maximum temperature is reached, and the maximum temperature is a temperature at which temperature of the silica glass is higher than or equal to a glass transition temperature and the silica glass is in a single phase.

As described above, the silica glass is once heated to the temperature at which temperature of the silica glass containing the rare earth element compound is higher than or equal to the glass transition temperature and the silica glass is in a single phase, and then cooled to the predetermined temperature at the increased cooling rate, whereby the crystallization and phase separation of the rare earth element compound can be suppressed. The manufacturing apparatus for an optical fiber of the present invention can therefore suppress the loss of the light propagating through the core containing the rare earth element compound.

Furthermore, a cooling member that cools the glass wire drawn from the optical fiber preform may be provided below the heating element.

The cooling member that cools the glass wire drawn from the optical fiber preform is provided below the heating element, whereby it becomes easier to decrease the temperature in the heating furnace, in the lower side of the heating furnace. It is therefore possible to easily form the temperature profile having the changing point at which the temperature decrease becomes steep on the downstream side of the place where the maximum temperature is reached, in the heating furnace.

Furthermore, the cooling member may surround the glass wire, and a blow of a cooling gas may be applied from the bottom toward the top between the inner peripheral surface of the cooling member and the surface of the glass wire.

The blow of the cooling gas is applied as described above, whereby the temperature decrease can be made steeper on the downstream side of the place where the maximum temperature is reached, in the heating furnace. Furthermore, the blow of the cooling gas is applied from the bottom toward the top, whereby the cooling gas flows along the glass wire. In this case, shaking of the glass wire can be suppressed as compared with a case where the cooling gas is applied perpendicularly to the side surface of the glass wire as in the methods described in Patent Literature 1 and Patent Literature 2. Thus, the optical fiber can be manufactured with high accuracy as compared with the methods described in Patent Literature 1 and Patent Literature 2.

Furthermore, a heat radiating material that transfers heat inside the heating furnace to the outside of the heating furnace may be provided below the heating element.

Such a heat radiating material is provided, whereby it becomes easier to radiate heat to the outside below the heating element in the heating furnace. It is therefore possible to easily form the temperature profile having the changing point at which the temperature decrease becomes steep on the downstream side of the place where the maximum temperature is reached, in the heating furnace.

As described above, according to the present invention, the manufacturing method for an optical fiber and the manufacturing apparatus for an optical fiber are provided capable of suppressing the loss of the light propagating through the core containing the rare earth element compound.

DETAILED DESCRIPTION

Hereinafter, embodiments of a manufacturing method for an optical fiber and a manufacturing apparatus for an optical fiber according to the present invention will be described in detail with reference to the drawings. The embodiments exemplified below are for facilitating understanding of the present invention, and are not for limiting interpretation of the present invention. The present invention can be modified and improved without departing from the spirit of the present invention.

Figure 1:
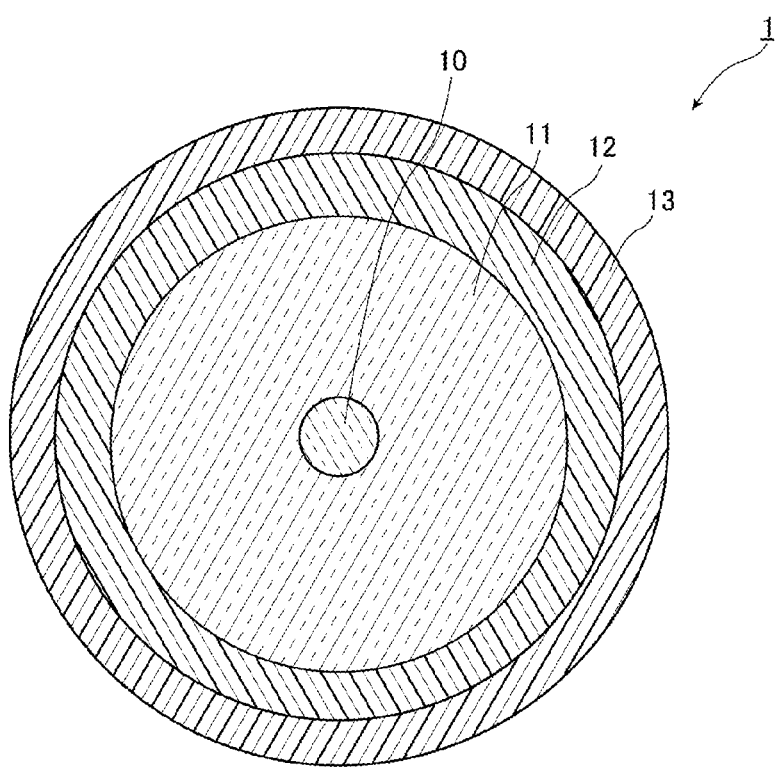
FIG. 1 is a diagram illustrating a cross section perpendicular to the longitudinal direction of an optical fiber according to one or more embodiments of the present invention.

FIG. 1 is a diagram illustrating a cross section perpendicular to the longitudinal direction of an optical fiber according to one or more embodiments of the present invention. An optical fiber 1 according to one or more embodiments is an amplification optical fiber. As illustrated in FIG. 1, the optical fiber 1 according to one or more embodiments includes a core 10, an inner clad 11 that is a clad surrounding the outer peripheral surface of the core 10 without a gap, an outer clad 12 that coats the outer peripheral surface of the inner clad 11, and a protective layer 13 that coats the outer peripheral surface of the outer clad 12, as main components. As described above, the optical fiber 1 has a so-called double clad structure. A refractive index of the inner clad 11 is lower than a refractive index of the core 10, and a refractive index of the outer clad 12 is lower than the refractive index of the inner clad 11. Furthermore, the core 10 is disposed at the center of the inner clad 11.

Examples of a material constituting the core 10 include silica glass to which a rare earth element such as ytterbium (Yb) is added. Examples of such a rare earth element include thulium (Tm), cerium (Ce), neodymium (Nd), europium (Eu), erbium (Er), and the like, in addition to Yb described above. Note that, the rare earth element forms a compound and is contained in the material constituting the core 10. For example, Yb forms an oxidized compound such as $Yb_2O_3$ and exists in the core 10. Furthermore, an element such as germanium (Ge) that increases the refractive index, or an element such as aluminum (Al) or phosphorus (P) that can suppress crystallization and photodarkening may be further added to the material constituting the core 10. Moreover, to adjust the refractive index, an element such as fluorine (F) or boron (B) that decreases the refractive index may be added to the material constituting the core 10.

Examples of a material constituting the inner clad 11 include pure silica glass to which no dopant is added. Note that, an element such as fluorine (F) that decreases the refractive index may be added to the material constituting the inner clad 11.

The outer clad 12 includes, for example, a resin, and examples of the resin include an ultraviolet curable resin and a thermosetting resin.

Examples of a material constituting the protective layer 13 include an ultraviolet curable resin and a thermosetting resin. When the outer clad 12 includes a resin, the material constituting the protective layer 13 is a resin different from the resin constituting the outer clad 12.

Next, a description will be given of the manufacturing apparatus for an optical fiber according to one or more embodiments of the present invention.

Figure 2:
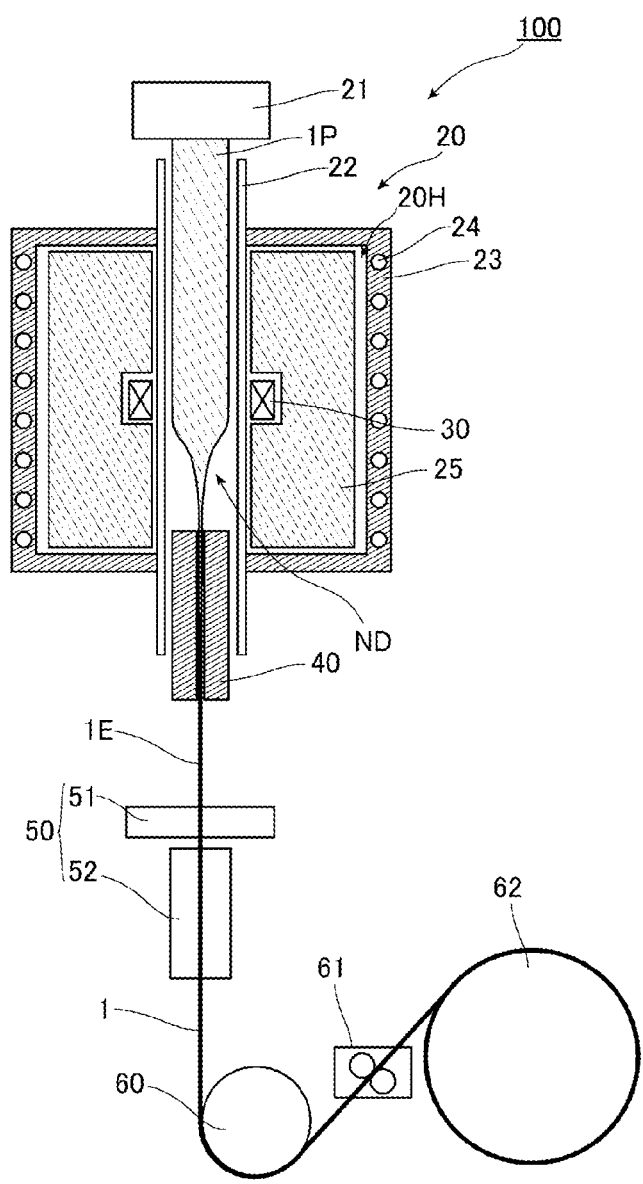
FIG. 2 is a diagram schematically illustrating a manufacturing apparatus for an optical fiber according to one or more embodiments of the present invention.

FIG. 2 is a diagram schematically illustrating the manufacturing apparatus for an optical fiber according to one or more embodiments. A manufacturing apparatus 100 for the optical fiber 1 illustrated in FIG. 2 includes a preform feeding device 21, a heating furnace 20, a coating device 50, a turn pulley 60, a drawing device 61, and a winding device 62, as main components. The optical fiber 1 is manufactured by the manufacturing apparatus 100 for an optical fiber.

The preform feeding device 21 is a device attached to the upper end portion of an optical fiber preform 1P that is to be the optical fiber 1, and including a motor that feeds the optical fiber preform 1P from the lower end side into the heating furnace 20 at a predetermined speed.

The heating furnace 20 according to one or more embodiments includes a housing 23, a core tube 22, a heating element 30, a heat insulating material 25, and a cooling member 40, as main components.

A refrigerant flow path 24 through which a refrigerant flows is formed in the outer wall of the housing 23. The housing 23 is cooled by the flow of the refrigerant through the refrigerant flow path 24, and damage to the housing 23 due to heat is suppressed. Furthermore, the housing 23 includes a through hole penetrating in the vertical direction in the central portion, and the core tube 22 is inserted into the through hole. In one or more embodiments, the core tube 22 protrudes from each of the upper end and the lower end of the housing 23. However, the core tube 22 does not have to protrude from at least one of the upper end or the lower end of the housing 23. Moreover, a hollow portion 20H communicating with the through hole is formed in the housing 23, and the heating element 30 is provided so that the core tube 22 can be heated from the outer peripheral surface side of the core tube 22 in the hollow portion 20H.

The heating element 30 according to one or more embodiments generates heat due to electric resistance when energized. The heating element 30 may be a part of the core tube 22. To effectively use the heat generated by the heating element 30, the heating element 30 and the core tube 22 are surrounded by the heat insulating material 25 in the hollow portion 20H. The number of the heat insulating materials 25 is not particularly limited, and the heat insulating material 25 may be divided into a plurality of parts.

The maximum temperature in the heating furnace 20 may be set to a high temperature of about 2000° C. although it depends on the size of the optical fiber preform 1P, a target outer diameter of a bare optical fiber 1E drawn from the optical fiber preform 1P, tension applied to the bare optical fiber 1E, and the like. Materials constituting the core tube 22, the heating element 30, and the heat insulating material 25 may therefore be carbon, for example. When carbon is used for the core tube 22, the heating element 30, and the heat insulating material 25, the inside of the heating furnace 20 may have an inert atmosphere. Thus, the inner peripheral surface side of the core tube 22 and the hollow portion 20H of the housing 23 may be filled with an inert gas such as argon (Ar) or helium (He).

The cooling member 40 is a member that cools a glass wire drawn from the optical fiber preform 1P, and is provided below the heating element 30 on the inner peripheral surface side of the core tube 22 in the heating furnace 20. Furthermore, the cooling member 40 according to one or more embodiments surrounds the glass wire drawn from the optical fiber preform 1P. Such a cooling member 40 may be configured such that cooling water flows inside, for example. The temperature of the cooling water may be a temperature at which boiling does not occur while the cooling water flows inside the cooling member 40, and a temperature at which excessive dew condensation does not occur on the cooling member 40. The cooling water may be supplied to the cooling member 40 at a constant temperature within a range of, for example, higher than or equal to 10° C. and less than or equal to 70° C. The temperature of the cooling water supplied to the cooling member 40 increases while the cooling water flows inside the cooling member 40, but the temperature of the cooling water when supplied to the cooling member 40 is kept constant, whereby a change over time can be suppressed in the temperature of the cooling water at each part in the cooling member 40.

Furthermore, a blow of the cooling gas may be applied from the bottom toward the top on the inner peripheral surface side of the cooling member 40 according to one or more embodiments. The blow of the cooling gas is applied from the bottom toward the top between the inner peripheral surface of the cooling member 40 and the surface of the glass wire drawn from the optical fiber preform 1P. The blow of the cooling gas is applied in this way, whereby the cooling gas easily flows along the surface of the glass wire drawn from the optical fiber preform 1P. Shaking of the glass wire can therefore be suppressed as compared with a case where the blow of the cooling gas is applied perpendicularly to the surface of the glass wire. The type of the cooling gas is not particularly limited, but the cooling gas may be He or Ar from viewpoints of thermal conductivity and the like.

The coating device 50 according to one or more embodiments includes a first coating device 51 and a second coating device 52. The first coating device 51 is a device that forms the outer clad 12 that coats the outer peripheral surface of the bare optical fiber 1E by causing the bare optical fiber 1E including the core 10 and the inner clad 11 drawn in the heating furnace 20 to pass through. The second coating device 52 is a device that forms the protective layer 13 that coats the outer peripheral surface of the outer clad 12.

The drawing device 61 is a device that draws the optical fiber 1 whose direction is changed by the turn pulley 60 at a predetermined drawing speed, and the winding device 62 is a device that winds the optical fiber 1 around a bobbin.

Next, a description will be given of the manufacturing method for an optical fiber according to one or more embodiments of the present invention.

Figure 3:
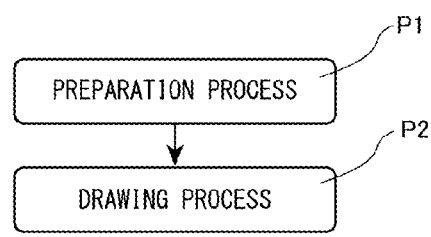
FIG. 3 is a flowchart illustrating a manufacturing method for an optical fiber according to one or more embodiments of the present invention.

FIG. 3 is a flowchart illustrating the manufacturing method for an optical fiber according to one or more embodiments of the present invention. According to the manufacturing method for an optical fiber of one or more embodiments, the optical fiber 1 is manufactured by using the manufacturing apparatus 100 for an optical fiber. As illustrated in FIG. 3, the manufacturing method for the optical fiber 1 according to one or more embodiments includes a preparation process P1 and a drawing process P2, as main processes.

<Preparation Process P1>

Figure 4:
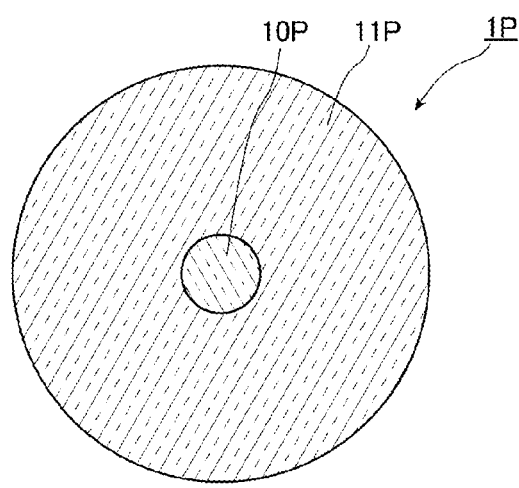
FIG. 4 is a diagram illustrating a cross section perpendicular to the longitudinal direction of an optical fiber preform prepared in a preparation process.

In this process, first, the optical fiber preform 1P is prepared including a core glass body that is to be the core 10 of the optical fiber 1 and a clad glass body that is to be the inner clad 11. FIG. 4 is a diagram illustrating a cross section perpendicular to the longitudinal direction of the optical fiber preform 1P prepared in the preparation process P1. As illustrated in FIG. 4, the optical fiber preform 1P includes a core glass body 10P that is to be the core 10 of the optical fiber 1 and a clad glass body 11P that is to be the inner clad 11. The method for producing the optical fiber preform 1P is not particularly limited, and for example, the optical fiber preform 1P can be produced by a modified chemical vapor deposition method (MCVD method).

Next, the optical fiber preform 1P is set in the heating furnace 20. As illustrated in FIG. 2, the upper end portion of the optical fiber preform 1P is fixed to the preform feeding device 21, and the optical fiber preform 1P is inserted into the core tube 22 of the heating furnace 20 from the lower end portion.

<Drawing Process P2>

This process is a process of drawing while heating the lower end portion of the optical fiber preform 1P in the heating furnace 20.

After the optical fiber preform 1P is set in the heating furnace 20 in the preparation process P1 as described above, the heating element 30 of the heating furnace 20 is caused to generate heat to heat the lower end portion of the optical fiber preform 1P. The lower end portion of the optical fiber preform 1P is melted by being heated in the heating furnace 20, and a tapered neck-down ND is formed and the diameter is reduced. In this way, the lower end portion of the optical fiber preform 1P is reduced in diameter, the core glass body 10P becomes the core 10, the clad glass body 11P becomes the inner clad 11, and the bare optical fiber 1E is obtained including the core 10 and the inner clad 11.

The outer diameter of the bare optical fiber 1E, that is, the outer diameter of the inner clad 11 is adjusted by adjustment of a speed at which the optical fiber preform 1P is fed to the downstream side of the heating furnace 20 by the preform feeding device 21 and a speed at which the optical fiber 1 is drawn by the drawing device 61. Furthermore, when the bare optical fiber 1E is drawn as described above, downward pulling force, that is, drawing tension is applied to the neck-down ND. The drawing tension applied to the neck-down ND is adjusted by adjustment of the temperature in the heating furnace 20, and the like.

Figure 5:
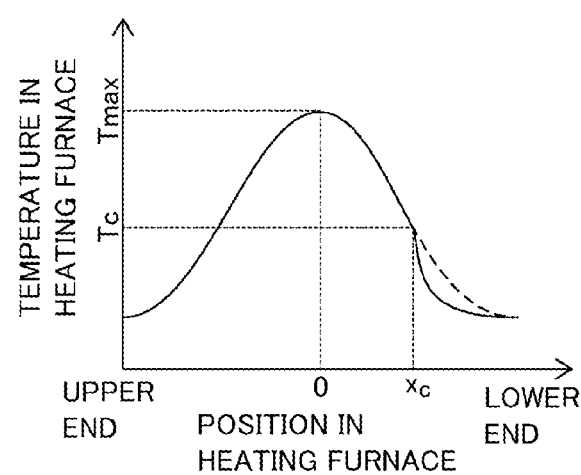
FIG. 5 is a diagram illustrating a temperature profile in a heating furnace.

FIG. 5 is a diagram illustrating a temperature profile in the heating furnace 20. As illustrated by the solid line in FIG. 5, the temperature profile in the heating furnace 20 is a profile in which the temperature is increased from the upstream side toward the downstream side of the heating furnace 20 to the maximum temperature $T_{max}$ and then decreased and that has a changing point at which a temperature decrease becomes steep on the downstream side from a place where the maximum temperature $T_{max}$ is reached. A temperature of the changing point is set as $T_c$, and a position of the changing point is set as $x_c$. Note that, the position in the heating furnace 20 is defined with the place where the maximum temperature $T_{max}$ is reached as a reference point (0), the downstream side from the reference point as the positive direction, and the upstream side as the negative direction.

In the heating furnace 20 according to one or more embodiments, the cooling member 40 is disposed below the heating element 30 of the core tube 22, whereby the temperature of the lower part of the heating furnace 20 is lower than the temperature of the upper part. The temperature in the heating furnace 20 therefore has a profile having the changing point as described above.

The temperature profile illustrated by the broken line in FIG. 5 illustrates a temperature profile after the changing point when the cooling member 40 is not included. When the cooling member 40 is not included, the temperature profile in the heating furnace 20 is roughly a normal distribution. That is, when the cooling member 40 is not included, the temperature profile in the heating furnace 20 is roughly symmetrical with respect to the reference point at which the maximum temperature $T_{max}$ is reached between the upstream side and the downstream side, but the temperature profile in the heating furnace 20 according to one or more embodiments is asymmetrical with respect to the reference point between the upstream side and the downstream side.

The maximum temperature $T_{max}$ in the heating furnace 20 is a temperature at which temperature of the silica glass constituting the core 10 is higher than or equal to the glass transition temperature and the silica glass is in a single phase. The maximum temperature $T_{max}$ in the heating furnace 20 will be described with reference to a binary equilibrium diagram of $Yb_2O_3$ and $SiO_2$.

Figure 6:
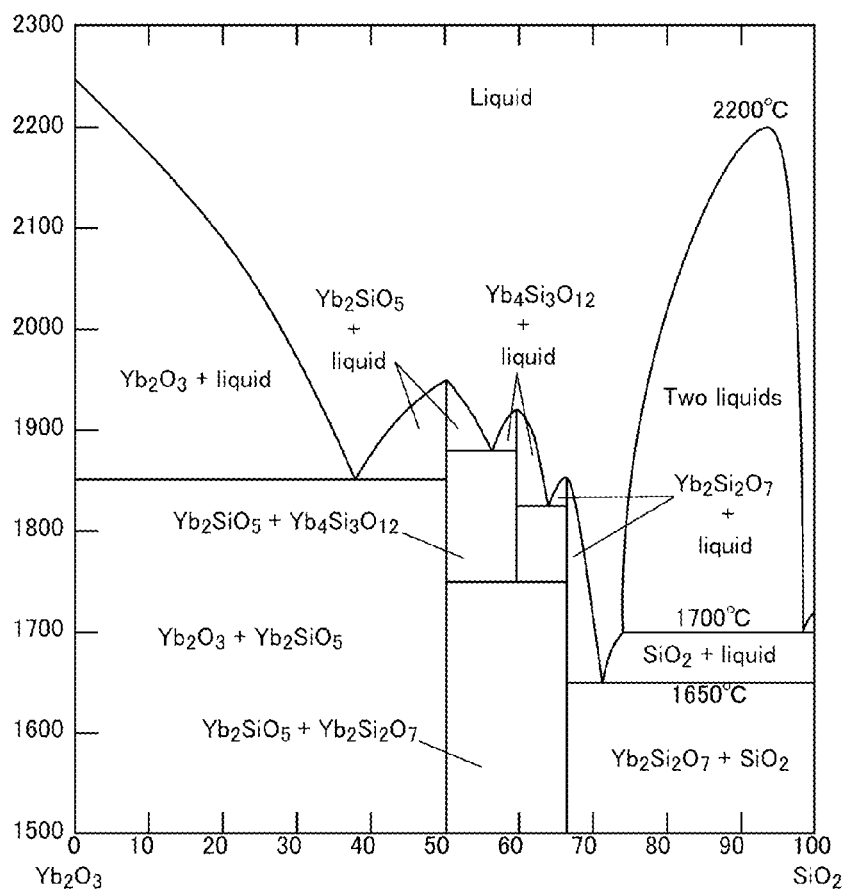
FIG. 6 is a binary equilibrium diagram of $Yb_2O_3$ and $SiO_2$.

FIG. 6 is the binary equilibrium diagram of $Yb_2O_3$ and $SiO_2$.

Silica glass ($SiO_2$) containing a few percent of $Yb_2O_3$ is in two liquid phases having composition ratios between $Yb_2O_3$ and $SiO_2$ are different from each other, in a predetermined temperature range of higher than or equal to 1700° C. An upper limit of the temperature at which such phase separation occurs differs depending on an amount of $Yb_2O_3$ added to the silica glass. The maximum temperature $T_{max}$ in the heating furnace 20 is the temperature at which the silica glass is in a single phase, and is a temperature higher than the temperature range in which the phase separation occurs. Thus, as illustrated in FIG. 6, the maximum temperature $T_{max}$ in the heating furnace 20 is a temperature at which the silica glass containing $Yb_2O_3$ is in a liquid phase (Liquid) in an equilibrium state. A few percent of $Yb_2O_3$ is added to the silica glass constituting the core 10, and if the maximum temperature $T_{max}$ in the heating furnace 20 is higher than or equal to 2200° C., the maximum temperature $T_{max}$ is a temperature at which temperature of the silica glass constituting the core 10 is higher than or equal to the glass transition temperature and the silica glass is in a single phase. However, as described above, the upper limit of the temperature at which the phase separation occurs differs depending on the amount of $Yb_2O_3$ added. The maximum temperature $T_{max}$ may therefore be lower than 2200° C. For example, the maximum temperature $T_{max}$ may be about 2000° C. to about 1730° C. depending on the composition of the materials constituting the core 10.

Figure 7:
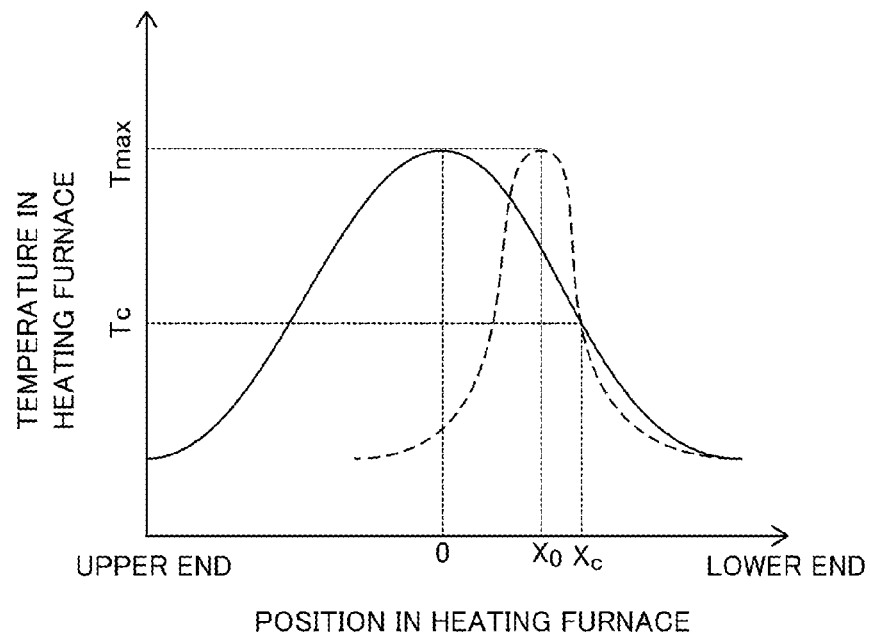
FIG. 7 is a diagram for explaining the temperature profile in the heating furnace illustrated in FIG. 5 in more detail.

FIG. 7 is a diagram for explaining the temperature profile in the heating furnace 20 illustrated in FIG. 5 in more detail. As illustrated in FIG. 7, the temperature profile on the upstream side from the changing point can be approximated as a part of a normal distribution illustrated by the solid line, and the temperature profile on the downstream side from the changing point can be approximated as a part of a normal distribution illustrated by the broken line. That is, the temperature profile on the upstream side from the changing point in the temperature profile in the heating furnace 20 can be approximated to a part of a normal distribution represented by the following equation (1), and the temperature profile on the downstream side from the changing point can be approximated to a part of a normal distribution represented by the following equation (2).

$$T = A\exp\left\{-\frac{x^2}{2\sigma_t^2}\right\} + B \quad (x < x_c) \tag{1}$$

$$T = A\exp\left\{-\frac{(x-x_0)^2}{2\sigma_b^2}\right\} + B \quad (x \geq x_c) \tag{2}$$

Here, $\sigma_t$ is a dispersion of the normal distribution when the temperature profile on the upstream side from the changing point is approximated to the part of the normal distribution represented by the equation (1), and $\sigma_b$ is a dispersion of the normal distribution when the temperature profile on the downstream side from the changing point is approximated to the part of the normal distribution represented by the equation (2). Thus, $\sigma_t > \sigma_b$. Furthermore, in the equations (1) and (2), T is a temperature at an arbitrary point in the heating furnace 20, A and B are constants, x is a distance from the reference point (0) to an arbitrary point when a position where the maximum temperature $T_{max}$ is reached is the reference point and the downstream side from the reference point is in the positive direction, $x_c$ is a distance from the reference point to a position where the changing point is reached, and $x_0$ is a distance from the reference point to a position where T represented by the equation (2) is the calculated maximum temperature $T_{max}$.

In this case, a half width of the normal distribution illustrated in the equation (1) is $2\sqrt{(2 \ln 2)}\sigma_t$, and a half width of the normal distribution illustrated in the equation (2) is $2\sqrt{(2 \ln 2)}\sigma_b$.

The ratio $\sigma_t/\sigma_b$ of the dispersion $\sigma_t$ of the equation (1) to the dispersion $\sigma_b$ of the equation (2) may be greater than or equal to 2, or may be greater than or equal to 3, and further may be less than or equal to 8, as described in the following calculation examples. Furthermore, the ratio $\sigma_t/\sigma_b$ may be less than or equal to 6.

In the calculation examples described below, the temperature profile of the glass constituting the optical fiber 1 near the neck-down ND and the outer diameter of the neck-down ND are estimated from the outer diameter of the optical fiber preform 1P, the outer diameter of the inner clad 11, the drawing speed of the optical fiber 1, and the temperature profile in the heating furnace 20. This estimation calculation is performed by solving relational expressions of equilibrium of forces, mass balance, and heat balance in formation of the neck-down ND. In the following calculation examples, to facilitate the calculation, it is assumed that the optical fiber preform 1P is a cylinder made entirely of pure quartz. Note that, in the following description, the glass constituting the optical fiber 1 near the neck-down ND may be simply referred to as glass.

From the equilibrium of forces in the formation of the neck-down ND, the relational expression of the following equation (3) is derived.

$$\left(v\frac{\partial S}{\partial x} + \frac{\partial S}{\partial t}\right) = -\frac{F}{\beta} \tag{3}$$

Here, x is a position in the heating furnace 20, t is a time, v is a moving speed of the glass at the position x, S is a cross-sectional area of the glass at the position x, F is drawing tension, and β is an elongational viscosity coefficient of the glass. In the case of pure quartz, the elongational viscosity coefficient β is represented by the following equation (4) as a function of a temperature Ta of the glass.

$$\beta(Ta) = 3\left(\frac{2.06 \times 10^4}{Ta} - 2.97\right) \tag{4}$$

From the mass balance, a relational expression of the following equation (5) is derived.

$$v\frac{\partial S}{\partial x} + \frac{\partial S}{\partial t} = -S\frac{\partial v}{\partial x} \quad (5)$$

From the heat balance, a relational expression of the following equation (6) is derived. Note that, g(Ta) in the following equation (6) is obtained by the following equation (7), and p(Ta) is obtained by the following equation (8).

$$v\frac{\partial Ta}{\partial x} + \frac{\partial Ta}{\partial t} = -\sqrt{\frac{4\pi}{S}} \times \frac{g(Ta)}{\rho C_p} - \frac{p(Ta)}{\rho C_p} \quad (6)$$

$$g(Ta) = E_m \times \sigma_B(Ta^4 - Tb^4) + h(Ta^4 - Tb^4) \quad (7)$$

$$p(Ta) = E_n \times \sigma_B(Ta^4 - Tb^4) \quad (8)$$

Here, Ta is a temperature of the glass, Tb is a temperature in the heating furnace 20, p is specific gravity of the glass, $C_p$ is specific heat of the glass, $E_m$ is thermal emissivity of the glass in the radial direction, and $E_n$ is thermal emissivity of the glass in the longitudinal direction, and $\sigma_B$ is Stefan-Boltzmann constant ($5.76 \times 10^{-8}$ J/sec/m²/K⁴). In the following calculation examples, $\rho$=2200 kg/m³, $E_m$=0.2, and $E_n$=0.2, and $C_p$ is approximated by the following equations (9) and (10).

$$C_p=800+0.65(Ta-273)(Ta\leq 873K) \quad (9)$$

$$C_p=1115+0.1257(Ta-273)(Ta>873K) \quad (10)$$

(Calculation Example 1)

Figure 8:
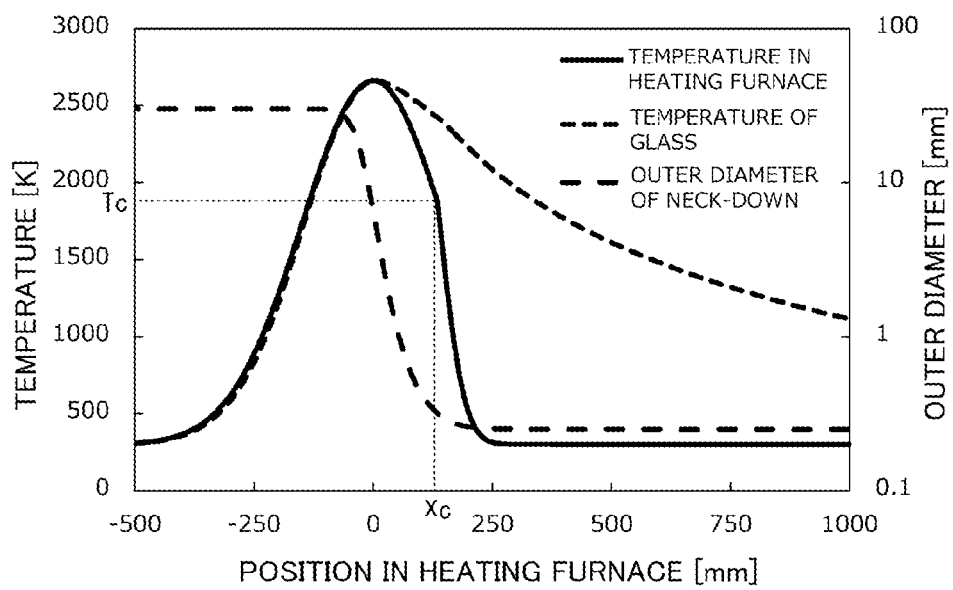
FIG. 8 is a diagram illustrating estimation results of the temperature profile in the heating furnace, a temperature profile of glass near a neck-down, and the outer diameter of the neck-down.

FIG. 8 illustrates estimation results of the temperature profile in the heating furnace 20, the temperature profile of the glass near the neck-down ND, and the outer diameter of the neck-down ND when the outer diameter of the optical fiber preform 1P is 30 mm, the outer diameter of the inner clad 11 is 0.25 mm, the drawing speed of the optical fiber 1 is 50 m/min, the drawing tension is 50 gf, the constant B of the equations (1) and (2) is 300 K, the dispersion $\sigma_t$ is 150 mm, the dispersion $\sigma_b$ is 50 mm, and $x_c$ is 135 mm. Note that, at this time, the value of the constant A in the equations (1) and (2) is set so that the drawing tension is 50 gf, and the ratio $\sigma_t/\sigma_b$=3.0 and the ratio $T_c/T_{max}$=0.70.

Figure 9:
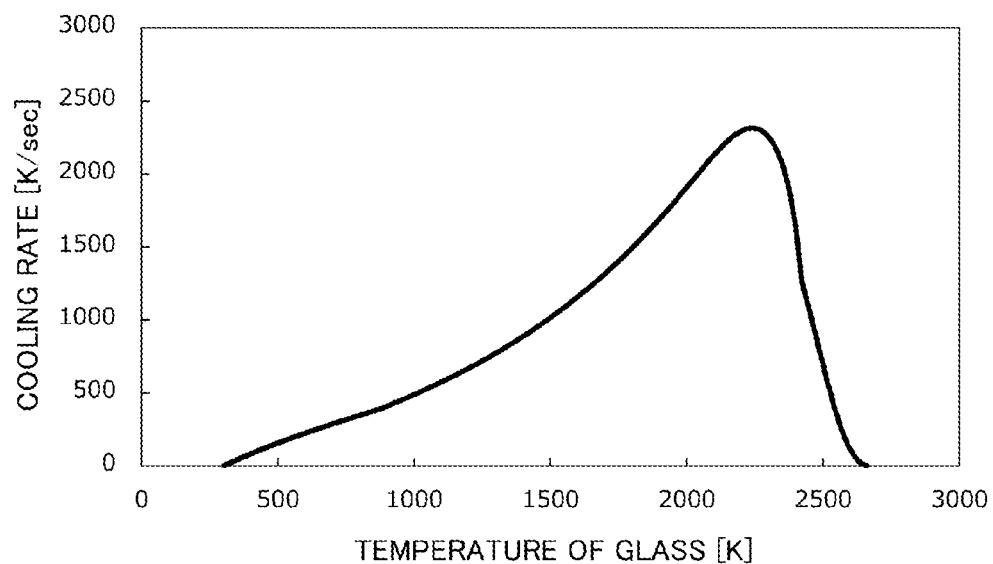
FIG. 9 is a diagram illustrating a relationship between a temperature of the glass obtained from the estimation results illustrated in FIG. 8 and a cooling rate of the glass at that time.

Furthermore, FIG. 9 illustrates a relationship between the temperature of the glass obtained from the estimation results illustrated in FIG. 8 and a cooling rate of the glass at that time.

(Calculation Example 2)

Figure 10:
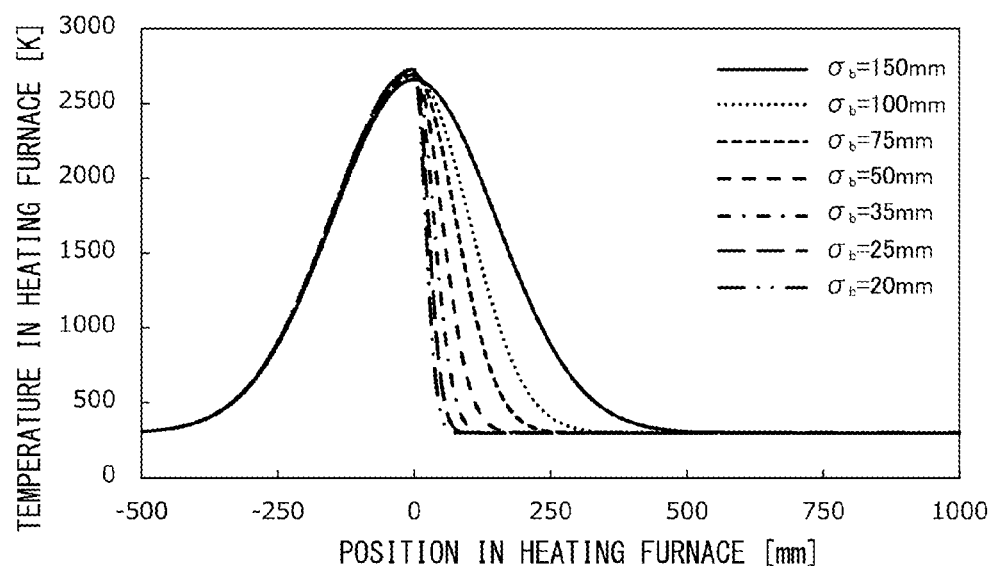
FIG. 10 is a diagram illustrating the temperature profile in the heating furnace when a dispersion $\sigma_t=150$ mm and $x_c=0$.
Figure 11:
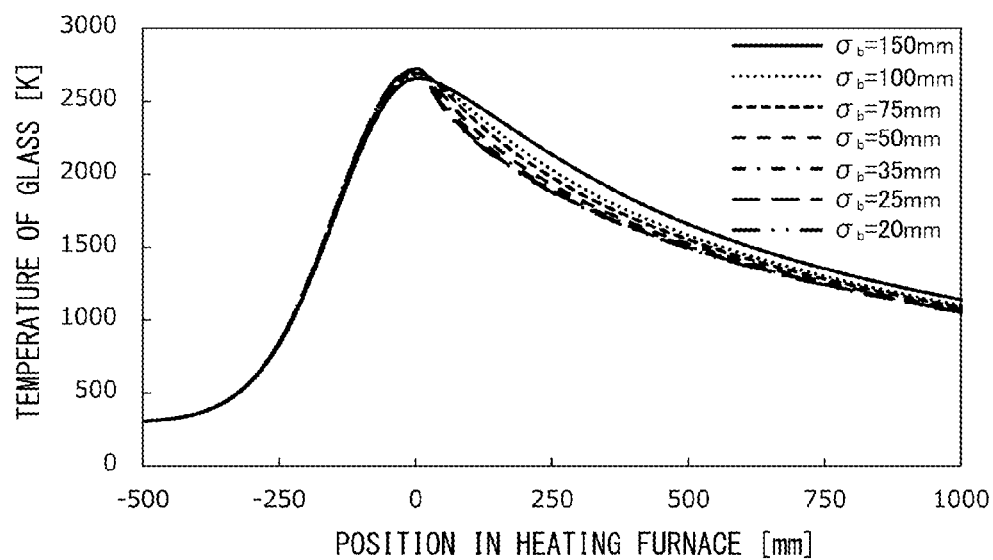
FIG. 11 is a diagram illustrating the temperature profile of the glass when the dispersion $\sigma_t=150$ mm and $x_c=0$.
Figure 12:
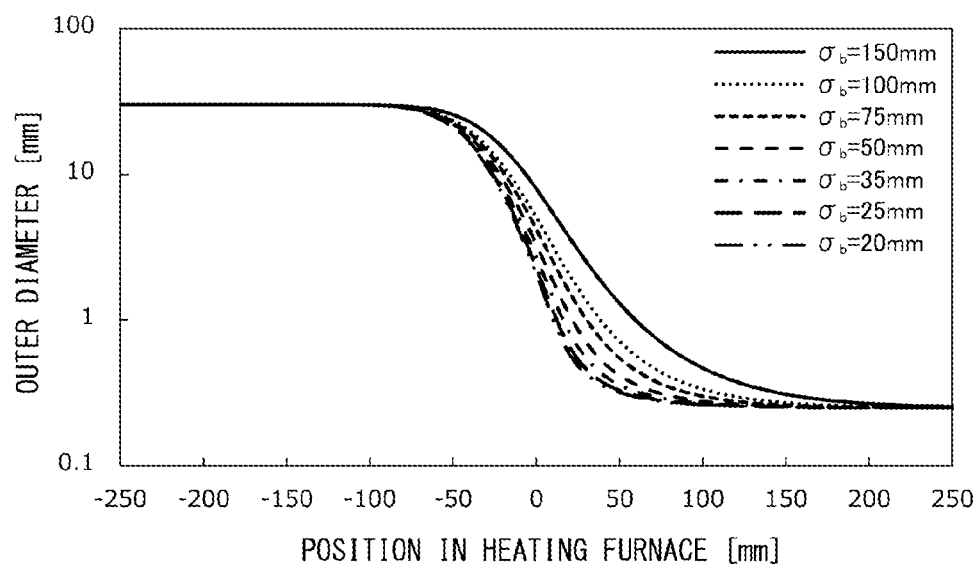
FIG. 12 is a diagram illustrating the outer diameter of the neck-down when the dispersion $\sigma_t=150$ mm and $x_c=0$.

Estimation was performed of the temperature profile in the heating furnace 20, the temperature profile of the glass near the neck-down ND, and the outer diameter of the neck-down ND by changing the dispersion $\sigma_t$ within a range from 50 mm to 300 mm and the dispersion $\sigma_b$ within a range from 20 mm to 300 mm when the outer diameter of the optical fiber preform 1P is 30 mm, the outer diameter of the inner clad 11 is 0.25 mm, the drawing speed is 50 m/min, the drawing tension is 50 gf, the constant B of the equations (1) and (2) is 300 K, and $x_c$ is 0 mm FIG. 10 illustrates the temperature profile in the heating furnace 20 when the dispersion $\sigma_t$ is 150 mm and the dispersion $\sigma_b$ is changed within a range from 20 mm to 150 mm, FIG. 11 illustrates the temperature profile of the glass under the same conditions, and FIG. 12 illustrates the outer diameter of the neck-down ND under the same conditions.

Figure 13:
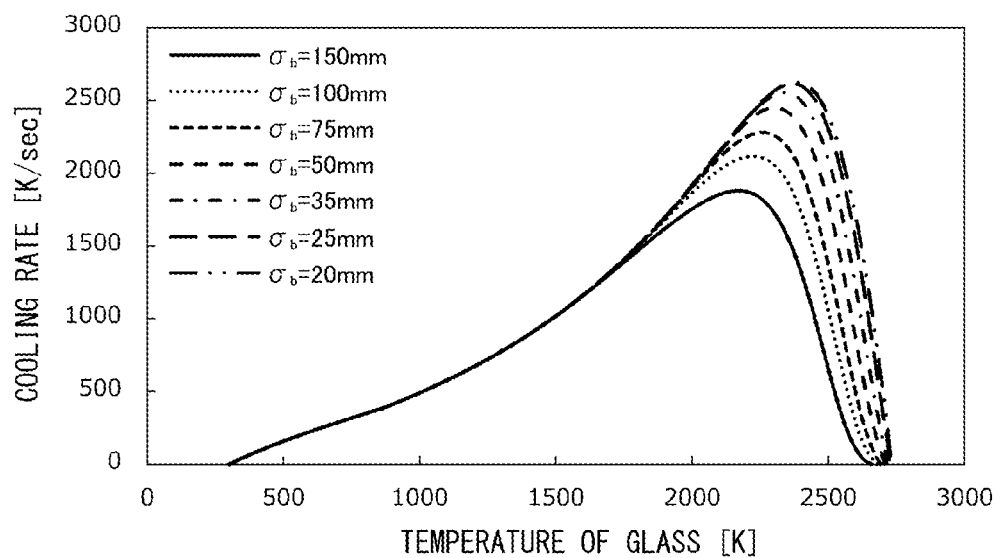
FIG. 13 is a diagram illustrating a relationship between the cooling rate of the glass at each position in the heating furnace, estimated from the temperature profile of the glass and the outer diameter of the neck-down when the dispersion $\sigma_t=150$ mm, and the temperature of the glass at that time.

Furthermore, FIG. 13 illustrates a relationship between the cooling rate of the glass at each position in the heating furnace 20, estimated from the temperature profile of the glass and the outer diameter of the neck-down ND when the dispersion $\sigma_t$ is 150 mm, and the temperature of the glass at that time.

Figure 14:
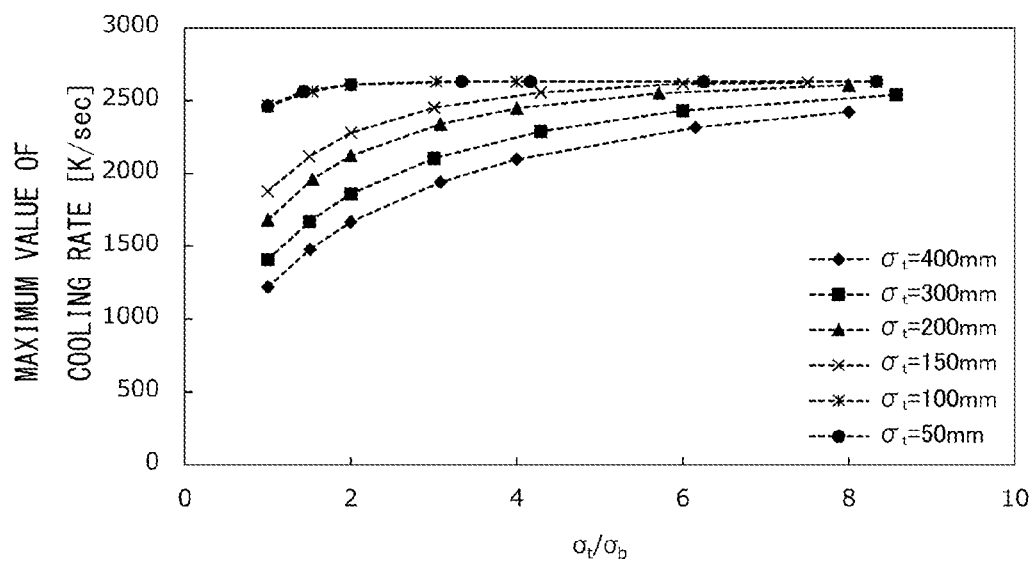
FIG. 14 is a diagram illustrating a relationship between a ratio $\sigma_t/\sigma_b$ and a maximum value of the cooling rate obtained from FIG. 13.
Figure 15:
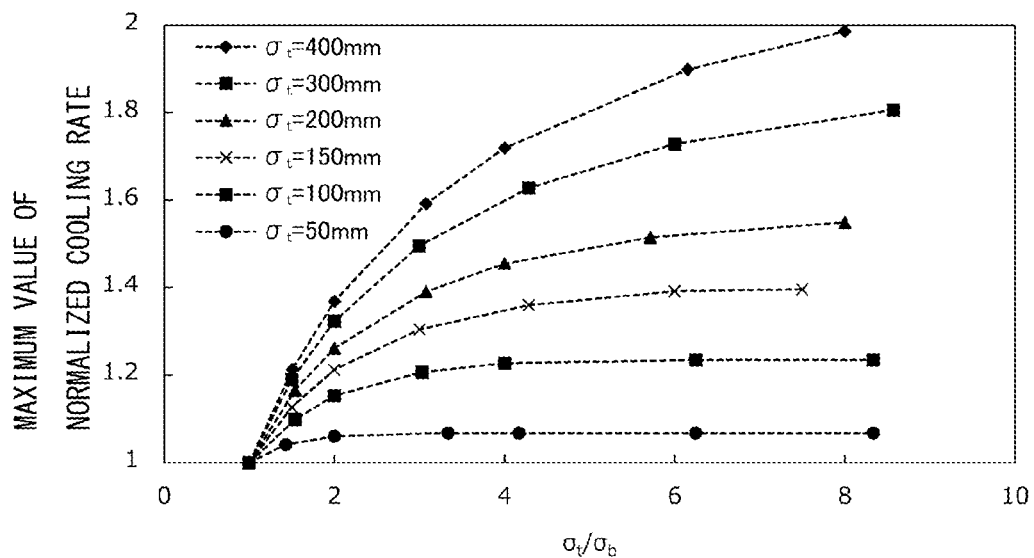
FIG. 15 is a diagram illustrating a relationship between a value obtained by normalizing the maximum value of the cooling rate with the maximum value of the cooling rate when $\sigma_t=\sigma_b$, and the ratio $\sigma_t/\sigma_b$.

FIG. 14 illustrates a relationship between the ratio $\sigma_t/\sigma_b$ and a maximum value of the cooling rate obtained from FIG. 13, and FIG. 15 illustrates a relationship between a value obtained by normalizing the maximum value of the cooling rate with the maximum value of the cooling rate when $\sigma_t=\sigma_b$, and the ratio $\sigma_t/\sigma_b$. Note that, FIGS. 14 and 15 also illustrate together the result of the same calculation for each case where the dispersion $\sigma_t$ is 50 mm, 100 mm, 150 mm, 200 mm, 300 mm, or 400 mm From FIGS. 14 and 15, it can be seen that the larger the value of the ratio $\sigma_t$/ab, the larger the cooling rate. From FIG. 15, when the ratio $\sigma_t/\sigma_b$ is less than 2, an increase in the maximum value of the cooling rate is large, and when the ratio $\sigma_t/\sigma_b$ is greater than or equal to 3, it becomes difficult for the maximum value of the cooling rate to increase. From this fact, it can be seen that the ratio $\sigma_t/\sigma_b$ may be greater than or equal to 2, or may be greater than or equal to 3, as described above. Furthermore, as the ratio $\sigma_t/\sigma_b$ has a lower value, setting of the temperature in the heating furnace tends to be easier, and from FIG. 14, it can be seen that the maximum value of the cooling rate does not change much when the ratio $\sigma_t/\sigma_b$ is greater than 8. Thus, the ratio $\sigma_t/\sigma_b$ may be less than or equal to 8 as described above from a viewpoint that the cooling rate can be made closer to the maximum value while the ratio $\sigma_t/\sigma_b$ is kept at a low value. Furthermore, it can be seen that as the dispersion at is smaller, the cooling rate asymptotically approaches a constant value from a value at which the ratio $\sigma_t/\sigma_b$ is small, but when the dispersion $\sigma_t$ is smaller than 100 mm, it is difficult to make the maximum value of the cooling rate large.

On the other hand, it can be seen that the maximum value of the cooling rate is a small value when the dispersion $\sigma_t$ is larger than 300 mm Thus, the dispersion $\sigma_t$ may be less than or equal to 300 mm.

(Calculation Example 3)

Figure 16:
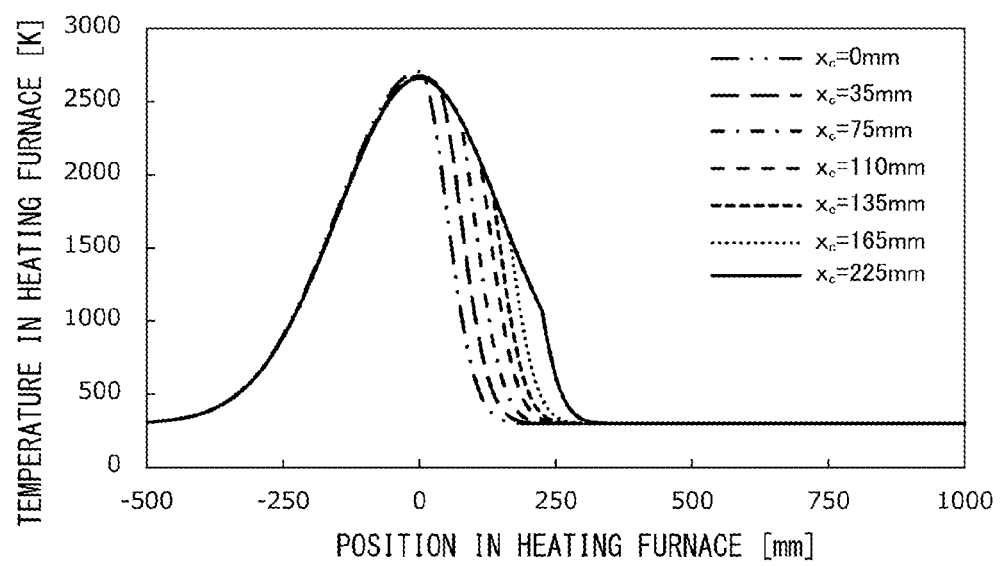
FIG. 16 is a diagram illustrating the temperature profile in the heating furnace when the ratio $\sigma_t/\sigma_b=3.0$.
Figure 17:
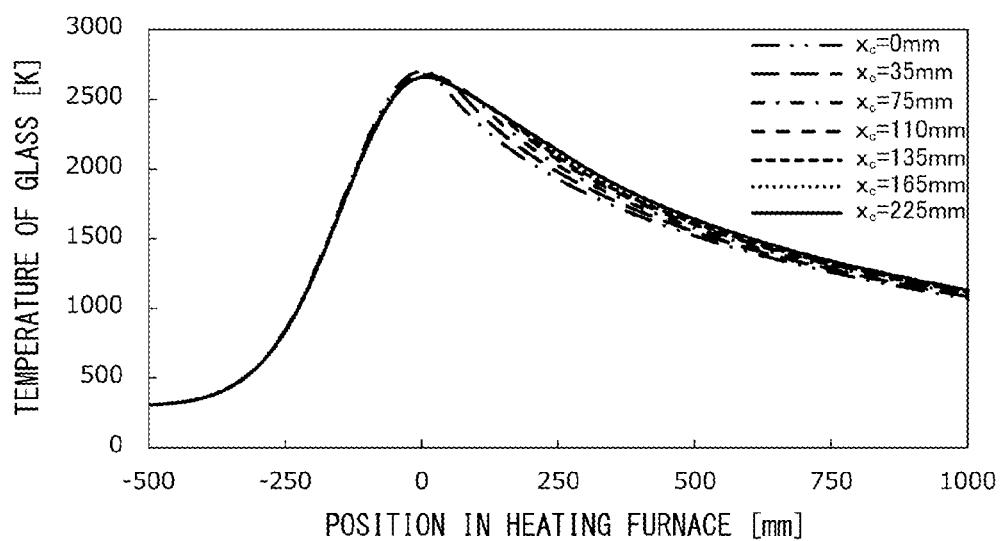
FIG. 17 is a diagram illustrating the temperature profile of the glass when the ratio $\sigma_t/\sigma_b=3.0$.
Figure 18:
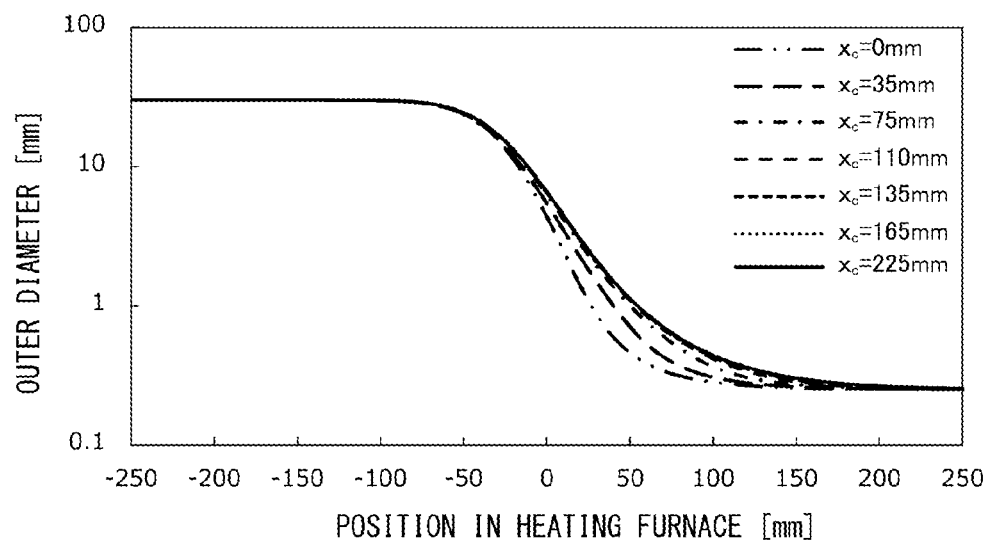
FIG. 18 is a diagram illustrating the outer diameter of the neck-down when the ratio $\sigma_t/\sigma_b=3.0$.

Estimation was performed of the temperature profile in the heating furnace 20, the temperature profile of the glass near the neck-down ND, and the outer diameter of the neck-down ND by changing $x_c$ within a range from 0 mm to 225 mm when the outer diameter of the optical fiber preform 1P is 30 mm, the outer diameter of the inner clad 11 is 0.25 mm, the drawing speed is 50 m/min, the drawing tension is 50 gf, the constant B is 300 K, the dispersion $\sigma_t$ is 150 mm, and the dispersion m is 50 mm (ratio $\sigma_t/\sigma_b$=3.0). FIG. 16 illustrates the temperature profile in the heating furnace 20 when $x_c$ is changed within the range from 0 mm to 225 mm, FIG. 17 illustrates the temperature profile of the glass under the same conditions, and FIG. 18 illustrates the outer diameter of the neck-down ND under the same conditions.

Figure 19:
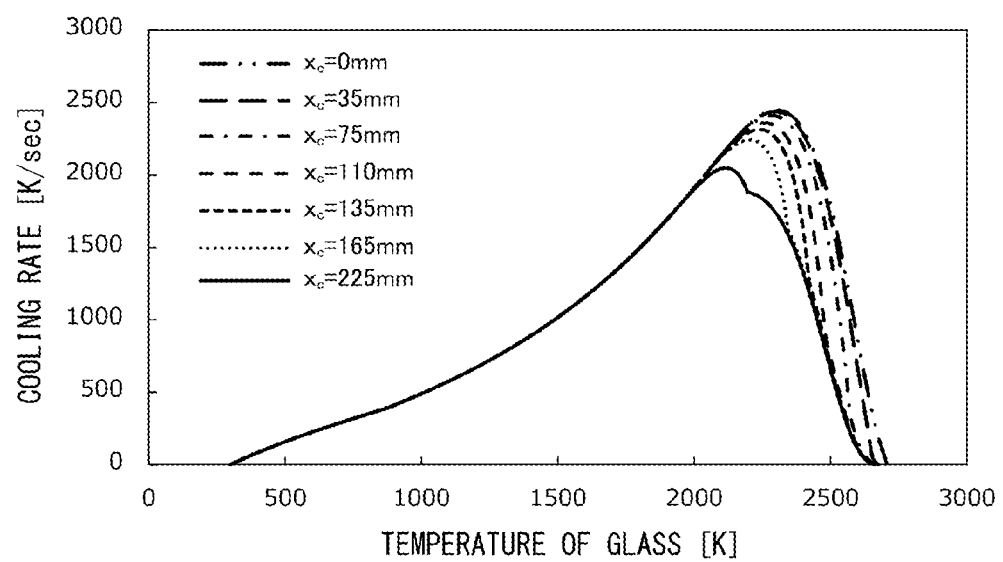
FIG. 19 is a diagram illustrating a relationship between the cooling rate of the glass at each position in the heating furnace, estimated from the temperature profile of the glass and the outer diameter of the neck-down when the ratio $\sigma_t/\sigma_b=3.0$, and the temperature of the glass at that time.

Furthermore, FIG. 19 illustrates a relationship between the cooling rate of the glass at each position in the heating furnace 20, estimated from the temperature profile of the glass and the outer diameter of the neck-down ND when the ratio $\sigma_t/\sigma_b$=3.0, and the temperature of the glass at that time.

Figure 20:
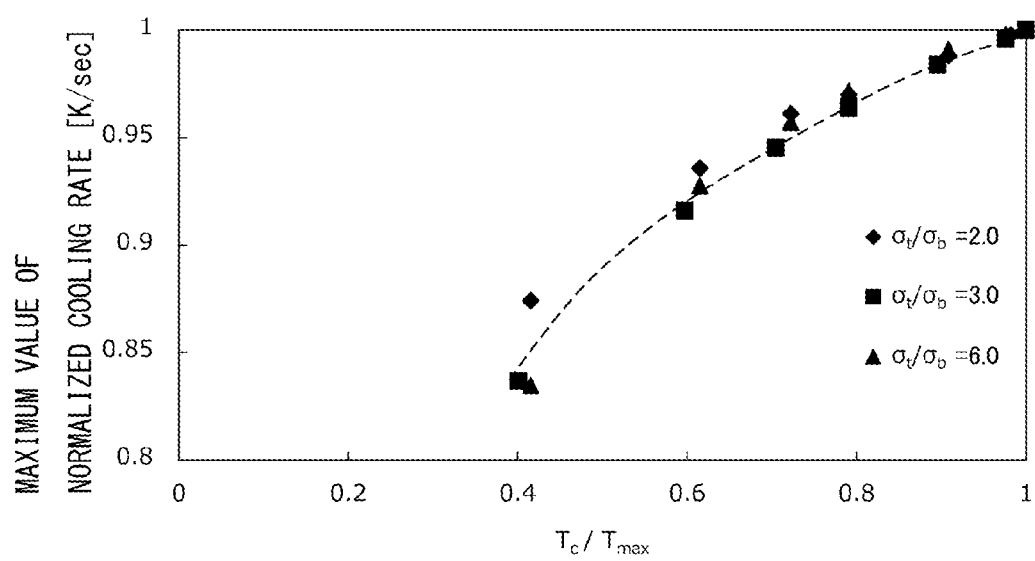
FIG. 20 is a diagram illustrating a relationship between a value obtained by normalizing the maximum value of the cooling rate obtained from FIG. 19 with the maximum value of the cooling rate when $x_c=0$, and a ratio $T_c/T_{max}$.

FIG. 20 illustrates a relationship between a value obtained by normalizing the maximum value of the cooling rate obtained from FIG. 19 with the maximum value of the cooling rate when $x_c$=0, and the ratio $T_c/T_{max}$. From FIG. 20, it can be seen that if the ratio $T_c/T_{max}$ is greater than or equal to 0.5 regardless of the value of the ratio $\sigma_t/\sigma_b$, a decrease in the maximum value of the cooling rate can be suppressed to about 10%. Thus, when the ratio $T_c/T_{max}$ is greater than or equal to 0.5, it becomes easier to rapidly cool the glass wire drawn from the optical fiber preform 1P after heating the glass wire to the maximum temperature. Furthermore, it can be seen that if the ratio $T_c/T_{max}$ is greater than or equal to 0.7, the decrease in the maximum value of the cooling rate can be suppressed to about 5%. Thus, when the ratio $T_c/T_{max}$ is greater than or equal to 0.7, it becomes much easier to rapidly cool the glass wire drawn from the optical fiber preform 1P after heating the glass wire to the maximum temperature. Note that, since the changing point is on the downstream side from the place where the maximum temperature is reached, the temperature $T_c$ of the changing point is lower than the maximum temperature $T_{max}$, and $T_c/T_{max}$ is less than 1.

In the heating furnace 20 whose temperature is set as described above, the lower end of the optical fiber preform 1P is heated and is in a molten state. Then, the glass wire melted is drawn from the optical fiber preform 1P. Upon coming out of the heating furnace 20, the drawn glass wire in the molten state solidifies immediately, and the core glass body 10P becomes the core 10, and the clad glass body 11P becomes the inner clad 11, whereby the bare optical fiber 1E is obtained including the core 10 and the inner clad 11.

After the bare optical fiber 1E is produced as described above, the bare optical fiber 1E is cooled to an appropriate temperature. The bare optical fiber 1E may be cooled by a cooling device (not illustrated). The cooled bare optical fiber 1E is coated with an ultraviolet curable resin that is to be the outer clad 12 and then irradiated with ultraviolet rays, in the first coating device 51, whereby the outer clad 12 is formed including the ultraviolet curable resin cured. Next, the bare optical fiber 1E coated with the outer clad 12 is coated with an ultraviolet curable resin that is to be the protective layer 13 and then irradiated with ultraviolet rays, in the second coating device 52, whereby the ultraviolet curable resin is cured and the protective layer 13 is formed, and the optical fiber 1 illustrated in FIG. 1 is obtained.

Then, a direction of the optical fiber 1 is changed by the turn pulley 60, and the optical fiber 1 is wound by the winding device 62.

As described above, the manufacturing method for the optical fiber 1 according to one or more embodiments includes the drawing process P2 that performs drawing while heating, in the heating furnace 20, the lower end portion of the optical fiber preform 1P that is to be the optical fiber 1 including the core 10 consisting of silica glass containing the rare earth element compound. Furthermore, the temperature profile in the heating furnace 20 is a profile in which the temperature is increased from the upstream side toward the downstream side of the heating furnace 20 to the maximum temperature $T_{max}$ and then decreased and that has a changing point at which a temperature decrease becomes steep on the downstream side from a place where the maximum temperature $T_{max}$ is reached. Moreover, the maximum temperature $T_{max}$ is a temperature at which temperature of the silica glass is higher than or equal to a glass transition temperature and the silica glass is in a single phase.

In the silica glass containing the rare earth element compound, the crystallization and phase separation of the rare earth element compound occur at a temperature lower than a temperature at which the silica glass containing the rare earth element compound is in a single phase at higher than or equal to the glass transition temperature. Thus, heating is performed once to the temperature at which temperature of the silica glass containing the rare earth element compound is higher than or equal to the glass transition temperature and the silica glass is in a single phase, and then cooling is performed to a predetermined temperature at an increased cooling rate, whereby a time spent in the area indicated by Two liquids illustrated in FIG. 6 is shortened, so that the crystallization and phase separation of the rare earth element compound can be suppressed. The manufacturing method for the optical fiber 1 according to one or more embodiments can therefore suppress loss of light propagating through the core 10 containing the rare earth element compound.

Furthermore, in the manufacturing method for the optical fiber 1 according to one or more embodiments, the temperature profile in the heating furnace 20 is set so that the cooling rate is maximized at a temperature at which separation occurs into a plurality of liquid phases respectively having different composition ratios between the rare earth element compound and the pure silica glass in the equilibrium state. The cooling rate is maximized in a temperature range in which the phase separation occurs in the silica glass containing the rare earth element compound, whereby the phase separation of the silica glass containing the rare earth element compound can be further suppressed.

Furthermore, the manufacturing apparatus 100 for the optical fiber 1 according to one or more embodiments includes the heating furnace 20 that heats the optical fiber preform 1P that is to be the optical fiber 1 having the core 10 including the silica glass containing the rare earth element compound. The temperature profile in the heating furnace 20 is set as described above. As described above, the silica glass containing the rare earth element compound is once heated to the temperature that is higher than or equal to the glass transition temperature and at which the silica glass is in a single phase, and then cooled to the predetermined temperature at the increased cooling rate, whereby the crystallization and phase separation of the rare earth element compound can be suppressed. The manufacturing apparatus 100 for the optical fiber 1 according to one or more embodiments can therefore suppress the loss of the light propagating through the core containing the rare earth element compound.

Furthermore, in the manufacturing apparatus 100 for the optical fiber 1 according to one or more embodiments, the cooling member 40 that cools the glass wire drawn from the optical fiber preform 1P is provided below the heating element 30 that heats the heating furnace 20. The cooling member 40 that cools the glass wire drawn from the optical fiber preform 1P is provided below the heating element 30 that heats the heating furnace 20, whereby it becomes easier to decrease the temperature in the heating furnace 20, in the lower side of the heating furnace 20. It is therefore possible to easily form the temperature profile having the changing point at which the temperature decrease becomes steep on the downstream side of the place where the maximum temperature $T_{max}$ is reached, in the heating furnace 20.

Furthermore, in the manufacturing apparatus 100 for the optical fiber 1 according to one or more embodiments, the cooling member 40 may surround the glass wire drawn from the optical fiber preform 1P, and the blow of the cooling gas may be applied from the bottom toward the top between the inner peripheral surface of the cooling member 40 and the surface of the glass wire. The blow of the cooling gas is applied in this way, whereby the temperature decrease can be made steeper on the downstream side of the place where the maximum temperature $T_{max}$ is reached, in the heating furnace 20. Furthermore, the blow of the cooling gas is applied from the bottom toward the top, whereby the cooling gas flows along the glass wire. In this case, shaking of the glass wire can be suppressed as compared with a case where the cooling gas is applied perpendicularly to the side surface of the glass wire as in the methods described in Patent Literature 1 and Patent Literature 2. Thus, the optical fiber 1 can be manufactured with high accuracy as compared with the methods described in Patent Literature 1 and Patent Literature 2.

Although the present invention has been described above by exemplifying embodiments, the present invention is not limited thereto.

For example, a means that makes the temperature decrease steep on the downstream side from the place where the maximum temperature $T_{max}$ is reached in the heating furnace 20 is not limited to the cooling member 40 exemplified in the embodiments described above. For example, a heat radiating material that transfers heat inside the heating furnace 20 to the outside of the heating furnace 20 may be provided below the heating element 30 that heats the heating furnace 20. A thermal conductivity of the heat radiating material is made higher than a thermal conductivity of the heat insulating material 25. Such a heat radiating material is provided, whereby it becomes easier to radiate heat to the outside from the lower side than from the upper side in the heating furnace 20. It is therefore possible to easily form the temperature profile having the changing point at which the temperature decrease becomes steep on the downstream side of the place where the maximum temperature $T_{max}$ is reached, in the heating furnace 20.

Figure 21:
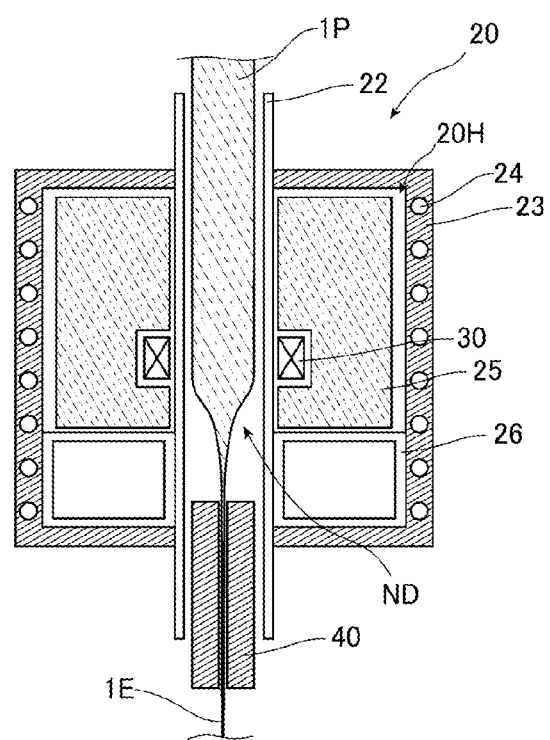
FIG. 21 is a diagram illustrating a cross section of a heating furnace according to a modification.
Figure 22:
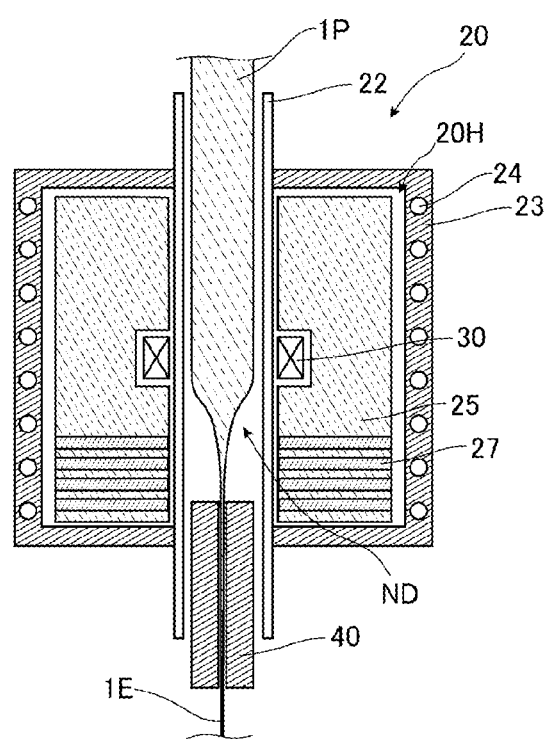
FIG. 22 is a diagram illustrating a cross section of a heating furnace according to another modification.
Figure 23:
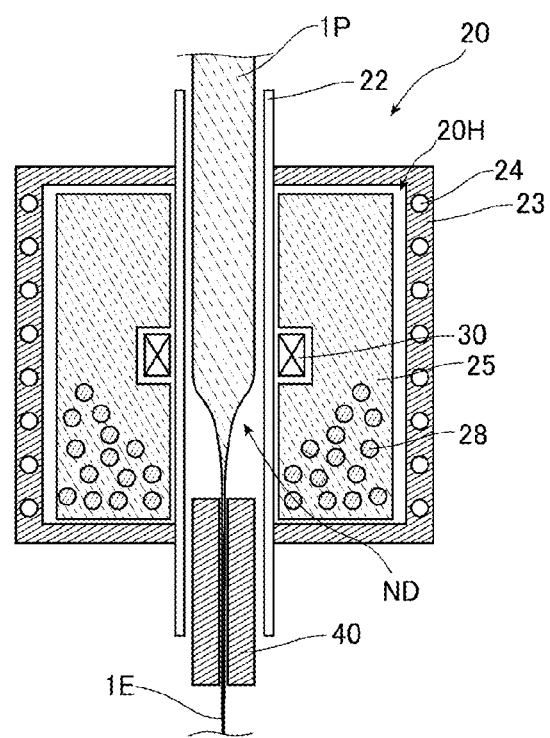
FIG. 23 is a diagram illustrating a cross section of a heating furnace according to yet another modification.

FIGS. 21 to 23 are diagrams illustrating a cross section of the heating furnace 20 according to such a modification.

The heating furnace 20 illustrated in FIG. 21 includes a hollow tube 26 as a heat radiating material below the heat insulating material 25 in the hollow portion 20H of the housing 23. The hollow tube 26 includes, for example, carbon or the like. From a viewpoint of facilitating the transfer of the heat inside the heating furnace 20 to the outside of the heating furnace 20, the hollow tube 26 may be in contact with the outer peripheral surface of the core tube 22 and the inner peripheral surface of the housing 23.

The heating furnace 20 illustrated in FIG. 22 includes a plurality of metal rods 27 provided to penetrate from the inside to the outside of the heating furnace 20 at the lower end portion of the heat insulating material 25. The metal rod 27 is a heat radiating material. The metal rod 27 includes a refractory metal. Examples of the refractory metal constituting the metal rod 27 include W, Re, Ta, Os, Mo, Nb, Ir, Ru, Hf, and the like. These metals may be used in combination. Furthermore, the number of metal rods 27 is not particularly limited. However, the metal rods 27 may be provided at positions that are rotationally symmetric with the axial center of the core tube 22 as the axis of symmetry. The plurality of metal rods 27 is provided in this way, whereby it becomes easier to uniformly radiate heat in the circumferential direction of the heating furnace 20.

The heating furnace 20 illustrated in FIG. 23 includes metal powder 28 dispersed at the lower end portion of the heat insulating material 25. The metal powder 28 is a heat radiating material, and the metal constituting the metal powder 28 is the same as that of the metal rod 27.

The examples illustrated in FIGS. 21 to 23 are only a part of cases where the heat radiating material is provided, and the method of providing the heat radiating material at the lower end portion of the heating furnace 20 is not limited to these. Furthermore, in the examples illustrated in FIGS. 21 to 23, the cooling member 40 is not essential.

Furthermore, in the embodiments described above, an example has been described in which the outer periphery of the inner clad 11 is circular in the cross section perpendicular to the longitudinal direction of the optical fiber 1. However, the outer peripheral shape of the inner clad 11 is not limited to a circular shape, and may be a polygon such as a hexagon, a heptagon, or an octagon, or a non-circular shape such as a shape in which the corners of the polygon are rounded.

Hereinafter, the content of the present invention will be described in more detail with reference to Examples and Comparative Examples, but the present invention is not limited thereto.

(Example 1)

Figure 24:
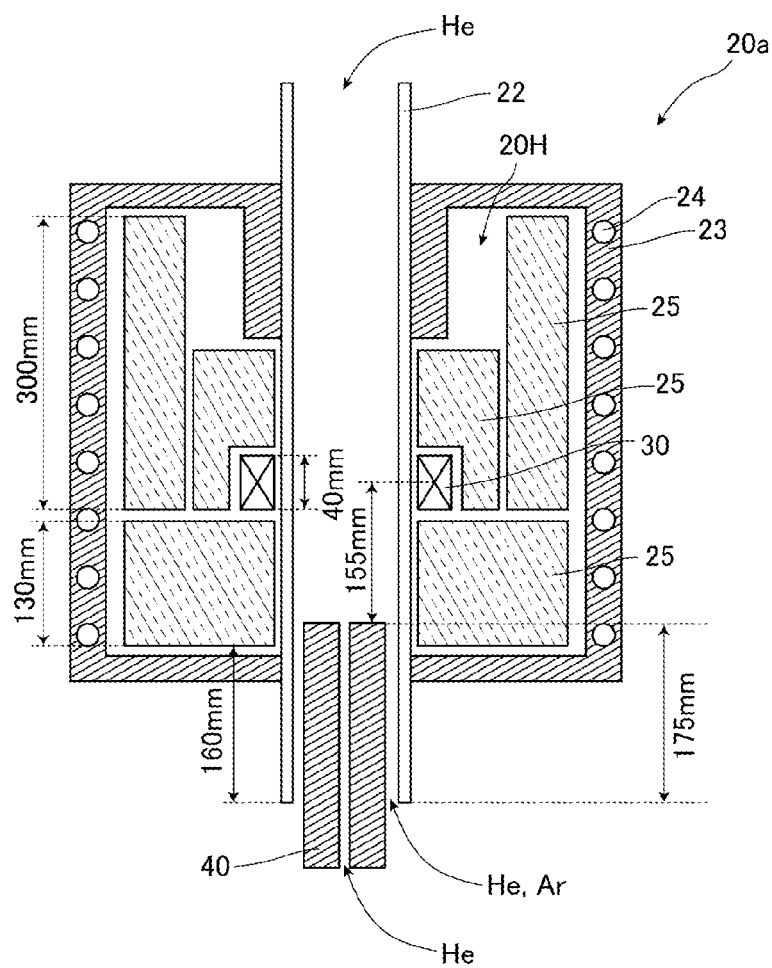
FIG. 24 is a diagram illustrating a cross section of a heating furnace used in Example 1.

FIG. 24 is a diagram illustrating a cross section of a heating furnace used in Example 1. In FIG. 24, components having the same configurations as those in FIG. 2 are designated by the same reference numerals. A heating furnace 20a used in Example is different from the heating furnace 20 exemplified in the embodiments in that the heat insulating material 25 is divided into three and the position of the heating element 30 is different.

In normal operation, the temperature in the heating furnace 20a is about 2000° C., so it is difficult to actually measure the temperature in the heating furnace 20a. The temperature in the heating furnace 20a was therefore set lower than the temperature during actual operation, and the temperature in the heating furnace 20a was actually measured with an Ir/Ir-40% RH thermocouple.

The length of the heating element 30 in the height direction was 40 mm, and the heat insulating material 25 having a height of 130 mm was disposed under the heating element 30. Furthermore, on the outside of the heating element 30, the heat insulating material 25 was disposed having a height of 300 mm from the lower end of the heating element 30. The core tube 22 extended downward to a position of 160 mm from the lower end of the heat insulating material 25. Furthermore, the cooling member 40 to which cooling water maintained at 26° C. is supplied to the inside was inserted from the lower end of the core tube 22. The cooling member 40 is inserted into the core tube 22 so that the upper end is disposed at a position of 175 mm from the lower end of the core tube 22, and the distance in the height direction between the upper end of the cooling member 40 and the center of the heating element 30 was 155 mm. Moreover, He at 6 L/min was caused to flow from the upper side of the core tube 22, He at 5 L/min and Ar at 3 L/min were caused to flow between the inner peripheral surface of the core tube 22 and the outer peripheral surface of the cooling member 40 from the lower side of the core tube 22, and He at 7 L/min was caused to flow from the lower side to the inner peripheral surface side of the tubular cooling member 40.

Figure 25:
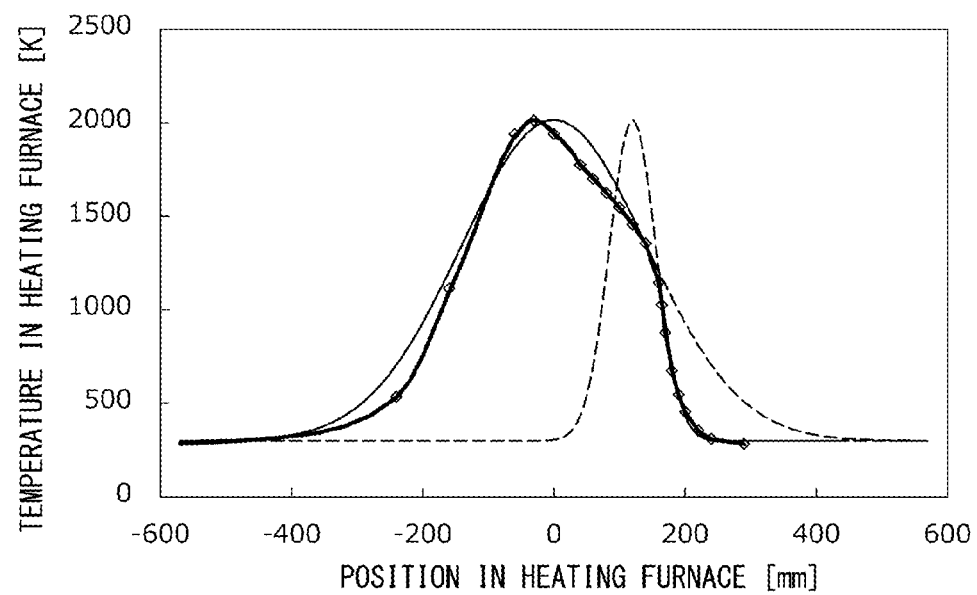
FIG. 25 is a diagram illustrating measurement results of the temperature profile in the heating furnace in Example 1.

FIG. 25 illustrates measurement results of the temperature profile in the heating furnace 20a in Example 1. In FIG. 25, the thick line indicates the measured temperature in the heating furnace 20a, and the thin lines indicate normal distributions that approximate the temperature profiles in the heating furnace 20a. Note that, in FIG. 25, the temperature profile is approximated to the normal distributions that are different between the upstream side and the downstream side from the changing point, and the lines that interpolate the respective normal distributions are indicated by broken lines.

(Comparative Example 1)

The temperature profile in the heating furnace 20a was measured in the same manner as in Example 1 except that the cooling member 40 was not inserted into the heating furnace 20a, and He at 6 L/min was caused to flow from the upper side of the core tube 22, and He at 10 L/min and Ar at 3 L/min were caused to flow from the lower side of the core tube 22. The results are illustrated in FIG. 26.

Figure 26:
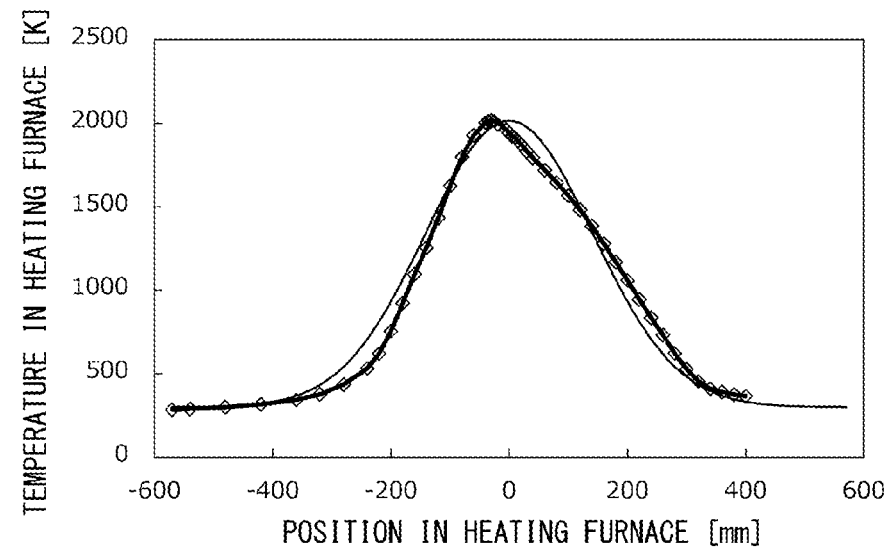
FIG. 26 is a diagram illustrating measurement results of the temperature profile in the heating furnace in Comparative Example 1.

The temperature profile in the heating furnace of Comparative Example 1 illustrated in FIG. 26 is almost symmetrical with respect to the place where the maximum temperature is reached between the upstream side and the downstream side, and is approximated to a normal distribution represented by the following equation (11) with a dispersion σ=140 mm, A=1715 K, and B=300 K.

$$T = A\exp\left\{-\frac{x^2}{2\sigma_t^2}\right\} + B \tag{11}$$

On the other hand, the temperature profile in the heating furnace 20a of Example 1 illustrated in FIG. 25 is approximated to normal distributions represented by the equations (1) and (2) with the dispersion $\sigma_f$=140 mm, the dispersion $\sigma_b$=35 mm, A=1715 K, and B=300 K. Note that, $x_c$=160 mm and $T_c$=1204 K. Furthermore, the ratio $\sigma_f/\sigma_b$=4.0 and the ratio $T_c/T_{max}$=0.70. The temperature profile of Example 1 was similar to that of Comparative Example 1 on the upstream side from the changing point, but the temperature gradient was steep on the downstream side due to influence of the cooling member 40.

(Example 2)

Figure 27:
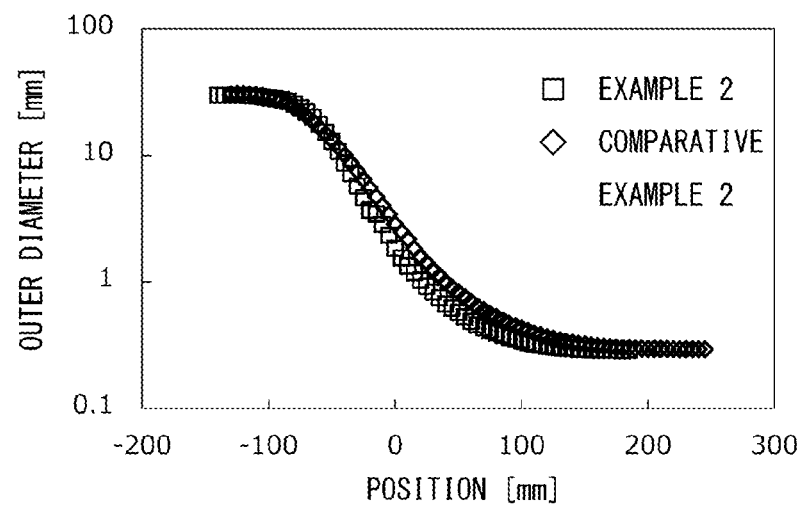
FIG. 27 is a diagram illustrating results of measuring the outer diameter of the neck-down in Example 2 and Comparative Example 2.
Figure 28:
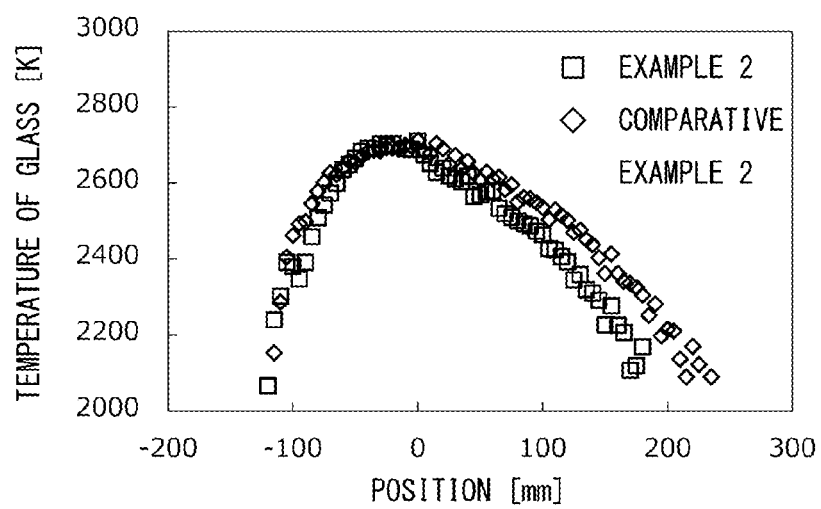
FIG. 28 is a diagram illustrating temperatures of the glass estimated from the outer diameter of the neck-down in Example 2 and Comparative Example 2.

Using the same heating furnace 20a as in Example 1, the optical fiber 1 was manufactured in which 2.3 wt % Yb, 3.3 wt % Al, and 3.8 wt % P were added to the core 10. At the end of the drawing process P2, the feeding of the optical fiber preform 1P and the drawing of the optical fiber 1 were stopped at the same time, and then the temperature in the heating furnace 20a was decreased, and a sample of the neck-down ND was collected in a state close to the actual operation. It was assumed that the outer diameter of the optical fiber preform 1P was 30 mm, the outer diameter of the inner clad 11 was 0.28 mm, the drawing speed of the optical fiber 1 was 50 m/min, and the drawing tension was 50 gf. FIG. 27 illustrates results of measuring the outer diameter of the neck-down ND, and FIG. 28 illustrates temperatures of the glass estimated from the outer diameter of the neck-down ND. The horizontal axis of FIGS. 27 and 28 represents a position in the longitudinal direction of the neck-down ND, a position where the temperature in the heating furnace is maximized is set as the reference point (0), and a downstream direction from the reference point is the positive direction.

(Comparative Example 2)

A sample of the neck-down ND was collected in the same manner as in Example 2 except that the cooling member 40 was not inserted into the heating furnace 20a and the drawing speed of the optical fiber 1 was set to 80 m/min. FIG. 27 illustrates results of measuring the outer diameter of the neck-down ND, and FIG. 28 illustrates temperatures of the glass estimated from the outer diameter of the neck-down ND.

It can be seen that the glass of Example 2 using the cooling member 40 is cooled more steeply than the glass of Comparative Example 2 on the downstream side from the position where the temperature in the heating furnace is maximized, as illustrated in FIG. 28.

(Comparative Example 3)

The optical fiber was manufactured in the same manner as in Example 2 except that the 2.3 wt % Yb, 3.1 wt % Al, and 4.0 wt % P were used as dopants added to the core, and the cooling member 40 was not inserted into the heating furnace 20a.

(Examples 3-1 to 3-17)

The optical fiber 1 was manufactured in the same manner as in Example 2 except that the length of the heating element 30 in the heating furnace 20a, the distance in the height direction from the upper end of the cooling member 40 to the center of the heating element 30, the content of the dopant added to the core 10, and the drawing speed of the bare optical fiber 1E were as illustrated in Table 1 below.

(Comparative Examples 4-1 to 4-11)

The optical fiber 1 was manufactured in the same manner as in Example 2 except that the cooling member 40 was not inserted into the heating furnace 20a, and the length of the heating element 30 in the heating furnace 20a, the content of the dopant added to the core 10, and the drawing speed of the bare optical fiber 1E were as illustrated in Table 2 below.

Figure 29:
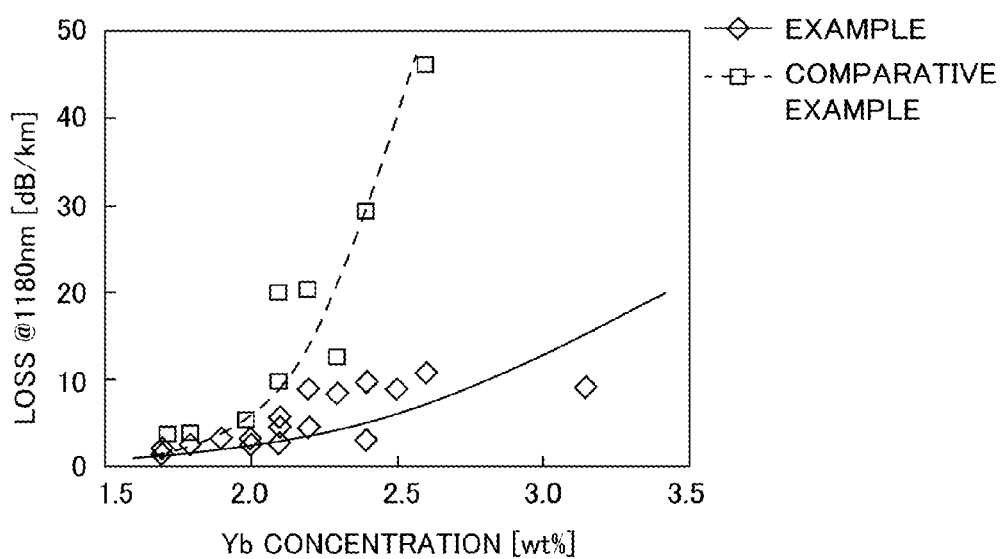
FIG. 29 is a diagram illustrating a relationship between a concentration of Yb added to the core of the optical fiber and loss of light propagating through the core.

The loss of the light having a wavelength of 1180 nm was measured for each of the optical fibers of Examples 2 and 3-1 to 3-17, and each of the optical fibers of Comparative Examples 3 and 4-1 to 4-11. The results are indicated in Table 1, Table 2, and FIG. 29. Note that, FIG. 29 illustrates a relationship between the concentration of Yb added to the core in Examples 2, Examples 3-1 to 3-17, Comparative Example 3, and Comparative Examples 4-1 to 4-11, and the loss of the light.

TABLE 1

| | Length of heating element [mm] | Drawing speed [m/min] | Distance from cooling member to heating element center [mm] | Amount of dopant added to core [wt %] | | | Loss of light @1180 nm [dB/km] |
|---|---|---|---|---|---|---|---|
| | | | | Yb | Al | P | |
| Example 2 | 40 | 50 | 155 | 2.3 | 3.3 | 3.8 | 9 |
| Example 3-1 | 30 | 50 | 155 | 2.6 | 4.9 | 4.3 | 11 |
| Example 3-2 | 30 | 50 | 115 | 2.5 | 4.5 | 4.4 | 9 |
| Example 3-3 | 30 | 50 | 155 | 2.4 | 4.0 | 4.1 | 10 |
| Example 3-4 | 30 | 50 | 155 | 2.3 | 3.7 | 3.8 | 8 |
| Example 3-5 | 30 | 50 | 115 | 2.2 | 4.1 | 3.7 | 5 |
| Example 3-6 | 30 | 20 | 115 | 2.4 | 3.1 | 1.7 | 3 |
| Example 3-7 | 30 | 20 | 115 | 2.1 | 3.8 | 3.9 | 3 |
| Example 3-8 | 30 | 20 | 115 | 2.1 | 4.0 | 4.0 | 5 |
| Example 3-9 | 30 | 20 | 115 | 2.1 | 4.0 | 3.6 | 6 |
| Example 3-10 | 30 | 20 | 115 | 2.0 | 4.1 | 3.1 | 2 |
| Example 3-11 | 30 | 20 | 115 | 2.0 | 3.4 | 3.1 | 3 |
| Example 3-12 | 30 | 20 | 115 | 2.0 | 3.5 | 3.8 | 3 |
| Example 3-13 | 30 | 20 | 115 | 1.9 | 3.4 | 3.7 | 3 |
| Example 3-14 | 30 | 20 | 115 | 1.8 | 3.3 | 3.9 | 3 |
| Example 3-15 | 30 | 20 | 115 | 1.7 | 3.4 | 3.2 | 2 |
| Example 3-16 | 30 | 20 | 115 | 1.7 | 3.0 | 3.3 | 2 |
| Example 3-17 | 20 | 30 | 65 | 3.1 | 4.9 | 3.9 | 9 |

TABLE 2

| | Length of heating element [mm] | Drawing speed [m/min] | Distance from cooling member to heating element center [mm] | Amount of dopant added to core [wt %] | | | Loss of light @1180 nm [dB/km] |
|---|---|---|---|---|---|---|---|
| | | | | Yb | Al | P | |
| Comparative Example 3 | 40 | 50 | Not inserted | 2.3 | 3.1 | 4.0 | 12 |
| Comparative Example 4-1 | 30 | 50 | Not inserted | 2.2 | 3.8 | 3.7 | 20 |
| Comparative Example 4-2 | 30 | 50 | Not inserted | 2.1 | 3.7 | 3.9 | 10 |

TABLE 2-continued

| | Length of heating element [mm] | Drawing speed [m/min] | Distance from cooling member to heating element center [mm] | Amount of dopant added to core [wt %] | | | Loss of light @1180 nm [dB/km] |
|---|---|---|---|---|---|---|---|
| | | | | Yb | Al | P | |
| Comparative Example 4-3 | 40 | 80 | Not inserted | 2.6 | 5.3 | 5.6 | 46 |
| Comparative Example 4-4 | 40 | 80 | Not inserted | 2.5 | 4.6 | 4.5 | 50 |
| Comparative Example 4-5 | 40 | 80 | Not inserted | 2.4 | 4.3 | 4.1 | 29 |
| Comparative Example 4-6 | 40 | 80 | Not inserted | 2.1 | 4.0 | 4.1 | 20 |
| Comparative Example 4-7 | 40 | 30 | Not inserted | 3.1 | 5.1 | 4.7 | 129 |
| Comparative Example 4-8 | 40 | 30 | Not inserted | 2.0 | 3.5 | 4.1 | 5 |
| Comparative Example 4-9 | 40 | 30 | Not inserted | 1.8 | 3.0 | 3.4 | 4 |
| Comparative Example 4-10 | 40 | 30 | Not inserted | 1.7 | 3.6 | 4.2 | 4 |
| Comparative Example 4-11 | 40 | 20 | Not inserted | 3.2 | 5.1 | 4.1 | 196 |

Comparing the optical fiber in Example with the optical fiber in Comparative Example having the same Yb concentration in Tables 1 and 2, it has been found that the loss of the light is suppressed in Example 2 and Examples 3-1 to 3-17 in which the temperature in the heating furnace 20a is steeply decreased on the downstream side from the position where the temperature in the heating furnace 20a is maximized due to insertion of the cooling member 40, as compared with Comparative Example 3 and Comparative Examples 4-1 to 4-11 in which the cooling member 40 is not inserted and the temperature does not steeply decreased. For example, comparing the optical fiber of Comparative Example 4-4 having a Yb concentration of 2.5% with the optical fiber of Example 3-2 having a Yb concentration of 2.5%, the loss of the light in the former is 50 dB, whereas the loss of the light in the latter is only 9 dB, and it can be seen that the loss of the light in Example is smaller than the loss of the light in Comparative Example. It is conceivable that this is because the silica glass constituting the core is heated to a temperature that is higher than or equal to the glass transition temperature of the silica glass and at which the silica glass is in a single phase, and then rapidly cooled, whereby the crystallization and phase separation of the rare earth element compound in the core are suppressed.

Furthermore, as illustrated in FIG. 29, when the concentration of Yb is greater than or equal to 2.0 wt % and less than or equal to 3.1 wt %, it has been found that the loss of the light is reduced in Example 2 and Examples 3-1 to 3-17 in which the temperature in the heating furnace 20a is steeply decreased on the downstream side from the position where the temperature in the heating furnace 20a is maximized due to insertion of the cooling member 40, as compared with Comparative Example 3 and Comparative Examples 4-1 to 4-11 in which the cooling member 40 is not inserted and the temperature does not steeply decreased.

As described above, according to the present invention, the manufacturing method for an optical fiber and the manufacturing apparatus for an optical fiber are provided capable of suppressing the loss of the light propagating through the core containing the rare earth element compound, and are expected to be used in fields of a processing machine, a medical laser device, and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . optical fiber
1P . . . optical fiber preform
10 . . . core
10P . . . core glass body
11 . . . inner clad
11P . . . clad glass body
12 . . . outer clad
13 . . . protective layer
20, 20a . . . heating furnace
21 . . . preform feeding device
22 . . . core tube
23 . . . housing
24 . . . refrigerant flow path
25 . . . heat insulating material
30 . . . heating element
40 . . . cooling member
100 . . . manufacturing apparatus for an optical fiber

The invention claimed is:

1. A manufacturing method for an optical fiber, comprising:
drawing, while heating in a heating furnace, a lower end of an optical fiber preform that is to be an optical fiber having a core consisting of silica glass containing a rare earth element compound, wherein
the heating furnace has a temperature profile in which a temperature of the heating furnace increases to a maximum temperature $T_{max}$ and then decreases from an upstream side of the heating furnace toward a downstream side of the heating furnace,
the temperature profile has a changing point at which the temperature decreases more steeply on the downstream side from a position where the maximum temperature $T_{max}$ is reached,
at the maximum temperature $T_{max}$, a temperature of the silica glass is higher than or equal to a glass transition temperature and the silica glass is in a single phase, and
the temperature profile in the heating furnace causes a cooling rate to be maximized at a temperature at which separation occurs into a plurality of liquid phases that respectively has a different composition ratio between the rare earth element compound and a pure silica glass in an equilibrium state.

2. A manufacturing method for an optical fiber, comprising:
drawing, while heating in a heating furnace, a lower end of an optical fiber preform that is to be an optical fiber having a core consisting of silica glass containing a rare earth element compound, wherein
the heating furnace has a temperature profile in which a temperature of the heating furnace increases to a maximum temperature $T_{max}$ and then decreases from an upstream side of the heating furnace toward a downstream side of the heating furnace, the temperature profile has a changing point at which the temperature decreases more steeply on the downstream side from a position where the maximum temperature $T_{max}$ is reached, at the maximum temperature $T_{max}$, a temperature of the silica glass is higher than or equal to a glass transition temperature and the silica glass is in a single phase, the temperature profile on the upstream side from the changing point is approximated based on a first normal distribution represented by below equation (1), and the temperature profile on the downstream side from the changing point is approximated based on a second normal distribution represented by below equation (2), and a temperature of the heating furnace causes a ratio $\sigma_t/\sigma_b$ of a dispersion $\sigma_t$ of the first normal distribution to a dispersion $\sigma_b$ of the second normal distribution to be greater than or equal to 2, $$T = A\exp\left\{-\frac{x^2}{2\sigma_t^2}\right\} + B \quad (x < x_c) \qquad (1)$$

$$T = A\exp\left\{-\frac{(x-x_0)^2}{2\sigma_b^2}\right\} + B \quad (x \geq x_c) \qquad (2)$$

where

T is a temperature at an arbitrary point in the heating furnace,

A and B are constants, x is a distance to the arbitrary point from a reference point when the reference point is a position where the maximum temperature $T_{max}$ is reached and a direction from the reference point to the downstream side is a positive direction, $x_c$ is a distance from the reference point to a position where the changing point is reached, and $x_0$ is a distance from the reference point to a position where T calculated by the equation (2) is a calculated maximum temperature $T_{max}$.

3. The manufacturing method for the optical fiber according to claim 2, wherein the temperature of the heating furnace causes the ratio $\sigma_t/\sigma_b$ to be greater than or equal to 3.

4. The manufacturing method for the optical fiber according to claim 3, wherein the temperature of the heating furnace causes the ratio $\sigma_t/\sigma_b$ to be greater than or equal to 3 and less than or equal to 8.

5. The manufacturing method for the optical fiber according to claim 2, wherein the dispersion $\sigma_t$ is greater than or equal to 100 mm and less than or equal to 300 mm.

6. A manufacturing method for an optical fiber, comprising:

drawing, while heating in a heating furnace, a lower end of an optical fiber preform that is to be an optical fiber having a core consisting of silica glass containing a rare earth element compound, wherein the heating furnace has a temperature profile in which a temperature of the heating furnace increases to a maximum temperature $T_{max}$ and then decreases from an upstream side of the heating furnace toward a downstream side of the heating furnace, the temperature profile has a changing point at which the temperature decreases more steeply on the downstream side from a position where the maximum temperature $T_{max}$ is reached, at the maximum temperature $T_{max}$, a temperature of the silica glass is higher than or equal to a glass transition temperature and the silica glass is in a single phase, and a ratio of a temperature $T_c$ at the changing point and the maximum temperature $T_{max}$ represented by $T_c/T_{max}$ is greater than or equal to 0.5.

7. The manufacturing method for the optical fiber according to claim 6, wherein the ratio $T_c/T_{max}$ is greater than or equal to 0.7.

8. The manufacturing method for the optical fiber according to claim 6, wherein a rare earth element contained in the rare earth element compound is ytterbium (Yb), and a concentration of the rare earth element in the core is greater than or equal to 2.0 wt % and less than or equal to 3.1 wt %.

9. The manufacturing method for the optical fiber according to claim 8, wherein the core further contains aluminum (Al) of greater than or equal to 3.0 wt % and less than or equal to 5.3 wt %, and phosphorus (P) of greater than or equal to 1.7 wt % and less than or equal to 5.6 wt %.

* * * * *